United States Patent
Becker

(10) Patent No.: US 12,211,300 B1
(45) Date of Patent: Jan. 28, 2025

(54) EXPOSURE CORRECTION FOR MACHINE VISION CAMERAS

(71) Applicant: Amazon Technologies, Inc., Seattle, WA (US)

(72) Inventor: Gabor Szedo Becker, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 338 days.

(21) Appl. No.: 17/543,411

(22) Filed: Dec. 6, 2021

(51) Int. Cl.
*G06V 30/18* (2022.01)
*B64U 101/30* (2023.01)
*H04N 13/239* (2018.01)
*H04N 23/73* (2023.01)

(52) U.S. Cl.
CPC ..... *G06V 30/18086* (2022.01); *H04N 13/239* (2018.05); *H04N 23/73* (2023.01); *B64U 2101/30* (2023.01); *B64U 2201/10* (2023.01)

(58) Field of Classification Search
CPC .......... G06V 30/18086; H04N 13/239; H04N 23/73; B64U 2101/30; B64U 2201/10
See application file for complete search history.

(56) References Cited

U.S. PATENT DOCUMENTS

| | | | |
|---|---|---|---|
| 2013/0135489 A1* | 5/2013 | Lee | H04N 17/002 348/222.1 |
| 2015/0201109 A1* | 7/2015 | Li | H04N 1/4074 348/222.1 |
| 2019/0243376 A1* | 8/2019 | Davis | G06T 7/292 |
| 2020/0036881 A1* | 1/2020 | Asoma | H04N 23/72 |
| 2020/0077033 A1* | 3/2020 | Chan | H04N 23/951 |
| 2022/0191379 A1* | 6/2022 | Numata | H04N 23/695 |
| 2023/0069500 A1* | 3/2023 | Sudret | H04N 23/76 |

* cited by examiner

Primary Examiner — Chan S Park
Assistant Examiner — Daniel C Chang
(74) Attorney, Agent, or Firm — Athorus, PLLC

(57) ABSTRACT

Systems and methods for automatically adjusting the exposure settings (e.g., exposure time, analog gain, etc.) of imaging device(s) and/or camera(s) utilized in machine vision systems. According to embodiments of the present disclosure, one or more images or frames of a stream of images captured by an imaging device of a machine vision system can be processed and analyzed to determine exposure settings that may be applied to capture subsequent images by the imaging device. For example, a frame of the stream of images can be partitioned into a plurality of zones, and the pixels of each zone can be non-uniformly sorted into a histogram to represent the distribution of pixels in each zone. The histogram values for each zone can be aggregated to determine an aggregated exposure value associated with the frame, which can be compared against a target exposure value in view of a response function associated with the imaging device to determine the exposure value for capturing subsequent frames in the stream of images.

21 Claims, 14 Drawing Sheets

EXPOSURE CORRECTION FOR MACHINE VISION CAMERAS

BACKGROUND

Machine vision systems are utilized by various applications to enable computers to "see." Typically, machine vision systems employ imaging sensors and/or cameras and signal processing to detect and analyze objects and features in the surrounding environment. For example, autonomous vehicles, such as unmanned aerial vehicles (UAV), may employ machine vision systems to facilitate autonomous operations of such vehicles. Frequently, the imaging sensors and/or cameras used in autonomous vehicles are employed in groups to facilitate stereo vision to improve depth information associated with objects and features in the environment. However, the imaging sensors and/or cameras employed in autonomous vehicles may encounter varying lighting conditions from the movement of the vehicle, features and structures in the environment, etc., which can cause overexposure and/or underexposure of images captured by the image sensors and/or cameras.

Figure 1A:
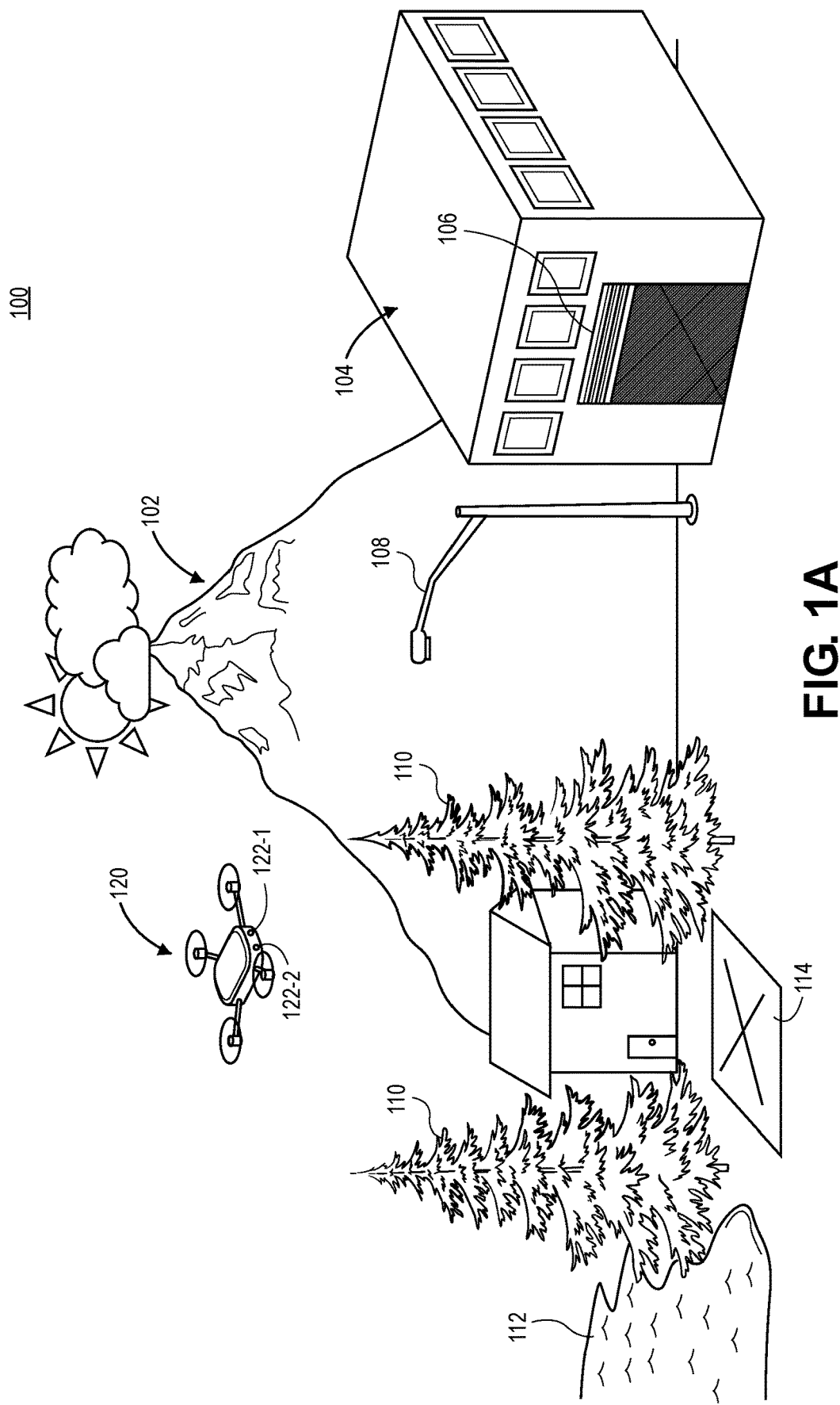
FIG. 1A is an illustration of an exemplary unmanned aerial vehicle (UAV), according to exemplary embodiments of the present disclosure.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

As is set forth in greater detail below, embodiments of the present disclosure are generally directed to systems and methods for adjusting the exposure settings (e.g., exposure time, analog gain, etc.) of imaging device(s) and/or camera(s) utilized in machine vision systems. According to embodiments of the present disclosure, one or more images or frames of a stream of images captured by an imaging device of a machine vision system can be processed and analyzed to determine exposure settings that may be applied to capture subsequent images by the imaging device. For example, a frame of the stream of images can be partitioned into a plurality of zones. A weighting can be determined and assigned to each zone, and the pixels of each zone can be non-uniformly sorted into a histogram to represent the distribution of pixels in each zone. According to certain aspects of the present disclosure, the bins of each histogram may be non-uniformly distributed such that the bins disposed at the edges of the histogram are narrower than the bins disposed toward the middle of the histogram. The histogram values for each zone can be aggregated to determine an aggregated exposure value associated with the frame. The aggregated exposure value can be compared against a target exposure value in view of a response function associated with the imaging device to determine the exposure value for capturing of the subsequent frame in the stream of images. Based on the exposure value, exposure settings (e.g., exposure time and gain) may be determined and applied to the imaging device in capturing a subsequent frame in the stream of images. The process can be iteratively repeated on subsequent frames in the stream of images to continuously determine and adjust the exposure settings for the imaging devices. Advantageously, embodiments of the present disclosure can accurately determine exposure values despite the non-linearity of response functions associated with imaging devices (e.g., in view of saturation of pixels, etc.) and the time variant nature of capturing images of an environment while not relying on an integrating component to quickly respond to large fluctuations in exposure from frame to frame.

In addition to generating histograms for each partitioned zone of an image, embodiments of the present disclosure can also provide various systems and methods for determining weights for each of the partitioned zones in an image. In generating the weights, the relative importance of each zone may be determined to generate weights for each zone in the image. According to exemplary embodiments, the weights may be determined based on one or more of static information associated with the imaging devices and/or the environment, dynamic external information; image information obtained in connection with the captured images, and/or image statistic information associated with captured information. For example, static information may include information such as orientation and/or positioning of the imaging devices, known position of environmental features (e.g., the horizon, the sun, the ground, etc.), known scenes and/or scene modes, and the like. Dynamic external information may include information provided by other sensors, such as global positioning system (GPS) sensors, inertial measurement units (IMU), gyroscopes, speed sensors, altimeters, magnetometers, and the like, which may facilitate determinations regarding the location and positioning of the imaging sensors. Image information may include information such as objects and features that may be detected and/or identified via image processing of the images. Image statistic information may include information such as whether each respective zone include high frequency content, edge content (e.g., vertical edge content, horizontal edge content, etc.), color/tone content, and the like. Based on one or more of the various information, weights can be determined for each of the zones to represent a relative importance of each of the zones in determining exposure values for the imaging devices. The determined weights may be applied in aggregating the histogram values to determine the aggregated exposure value.

In determining exposure setting, embodiments of the present disclosure may also facilitate determination of an exposure priority. Embodiments of the present disclosure can vary priority between exposure times and analog gain in determining exposure values for an imaging device. For example, in implementations where the imaging device may be employed on an autonomous vehicle such as a UAV, priority values between exposure times and analog gain may be determined on operational parameters associated with the UAV. The operational parameters on which the priority values may be determined may be obtained from sensors, such as GPS sensors, an IMU, gyroscopes, speed sensors, altimeters, etc. According to certain aspects, the resulting priority scheme may specify more than one transition point, where priority transitions between exposure time and analog gain, or vice versa, based on light conditions and operational parameters associated with the implementation of the imaging devices.

Embodiments of the present disclosure can also facilitate improved performance of machine visions systems employing multiple imaging devices (e.g., a stereo pair, etc.). According to certain aspects, embodiments of the present disclosure can provide a programmable bias of the exposure times of the imaging devices to tune the exposure times of the imaging devices to account for any difference in illumination. Aspects of the present disclosure can also provide a triggering pulse signal for enabling exposure times for the imaging devices that are center synchronized, rather than leading edge synchronized. For example, after the exposure values for the imaging devices have been determined, embodiments of the present disclosure can generate triggering pulses for each of the imaging devices that are center synchronized to facilitate more precisely capturing an identical scene.

"Exposure" is used herein as it is understood in the art. Specifically, exposure refers to the amount of light per unit area (the image plane illuminance times the exposure time) reaching the image sensor, as determined by shutter speed, lens aperture, and sensor sensitivity (ISO) of an imaging device. Exposure is measured in lux seconds. An image, or pixels of an image are considered overexposed when the pixels experience a loss of detail or data such that portions of the imaged object are not represented by the data and the brighter areas represented by the pixels cannot be distinguished from white.

Although embodiments of the present disclosure are described primarily with respect to imaging devices that may be employed on UAVs, embodiments of the present disclosure may be applicable to any implementations of machine vision systems, such as, for example, autonomous vehicles, ground based vehicles, autonomous ground-based vehicles, water-based vehicles, unmanned water-based vehicles, space vehicles, surveillance systems, monitoring systems, inspection/quality control systems, detection systems, and the like.

FIG. 1A is an illustration of an exemplary unmanned aerial vehicle (UAV) employing exemplary imaging devices to facilitate operation in an exemplary environment, according to exemplary embodiments of the present disclosure.

As shown in FIG. 1A, UAV 120 may be operating in environment 100. For example, UAV 120 may be performing a mission (e.g., delivery of packages, surveillance, photography, etc.) in environment 100. To facilitate autonomous operation in environment 100, UAV 120 may rely on imaging devices 122-1 and 122-2. For example, imaging devices 122-1 and 122-2 may include any type of imaging sensor (e.g., charge coupled device (CCD), complementary metal-oxide-semiconductor (CMOS), etc.) may capture a stream of images (e.g., color, grayscale, other imaging data, etc.) of environment 100 in which UAV 120 may be operating. In capturing the stream of images, light received by imaging devices 122-1 and 122-2 may be captured by an image sensor (e.g., CCD, CMOS, etc.), which may include a plurality of pixel sensors configured to detect information associated with each pixel. The pixel information may be translated to a digital value (e.g., a pixel value) for each pixel. According to an exemplary embodiment of the present disclosure, each pixel value may be represented by 12-bits such that each pixel may have a value between 0 and 4095. While the implementations discussed herein describe imaging devices in the form of digital color cameras or digital color video cameras, it will be appreciated that the imaging devices may be any form of imaging device including, but not limited to, digital cameras, depth sensors, range cameras, infrared cameras, or radiographic cameras. Likewise, the image data produced by the imaging devices may include, but is not limited to, visual image data, depth image data, infrared image data, radiographic image data, etc. Such devices generally operate by capturing light that is reflected from objects within an environment.

The images may be provided to a computing device local to UAV 120 or remote to UAV 120 (e.g., cloud-based computing devices, computing devices located at a ground-based facility, computing devices located on another vehicle, etc.), which may be processed to, for example, detect objects and/or features in the environment for any purpose, such as navigation, guidance, monitoring, collision avoidance, and the like. As shown in FIG. 1A, imaging devices 122-1 and 122-2 may be configured as a stereo pair to capture images nearly simultaneously during operation of UAV 120.

As UAV 120 operates in environment 100, UAV 120 may encounter varying illumination conditions. For example, environment 100 may include illumination conditions that are presented by the sun, as well as artificial illumination sources such as streetlamp 108. Additionally, illumination conditions may be affected by cloud cover, shade and shadows produced by structures (e.g., produced by tunnel 106, trees 110, mountain 102, building 104, etc.), reflections from lake 112, and the like. As UAV 120 operates in environment 100, UAV 120 may fly through areas having lighting conditions of near darkness (e.g., inside building 104), bright sunshine, and any illumination conditions in between. Accordingly, UAV 120 may experience changes in the lighting conditions based on its flight, as well as illumination conditions created by the environment. Further, certain changes in the illumination conditions may be abrupt. For example, in an implementation where UAV 120 emerges from tunnel 106, the illumination condition may abruptly change from darkness to bright sunshine. Similarly, as UAV 120 navigates to landing pad 114, which is positioned under the shade of trees 110, the illumination condition may change from bright sunshine to a darker illumination condition presented by the shade of trees 110. In view of varying and/or changes in illumination conditions, parameters associated with imaging devices 122-1 and 122-2 may need to be adjusted to ensure proper exposure. Both overexposed and underexposed images may make object and/or feature detection in the images difficult. In this regards, two parameters, gain and exposure time, are typically modified and/or adjusted to ensure proper exposure of the images captured by imaging devices 122-1 and 122-2.

According to embodiments of the present disclosure, as UAV 120 is operating in environment 100, parameters associated with imaging devices 122-1 and 122-2 may be dynamically adjusted as imaging devices 122-1 and 122-2 continuously capture a stream of images to ensure proper exposure of the stream of images For example, as the stream of images is captured by imaging devices 122-1 and 122-2, frames from the stream of images may be processed to dynamically adjust exposure settings (e.g., exposure time and gain parameters) associated with imaging devices 122-1 and 122-2 in view of changing illumination conditions and environmental conditions to ensure that the frames in the stream of images are properly exposed. Additionally, imaging devices 122-1 and 122-2 may be tuned to account for any discrepancies in the exposure performance between imaging devices 122-1 and 122-2. Further, imaging devices 122-1 and 122-2 may be synchronized to facilitate precise capture of the scene and mitigate the possibility of motion artefacts.

Figure 1B:
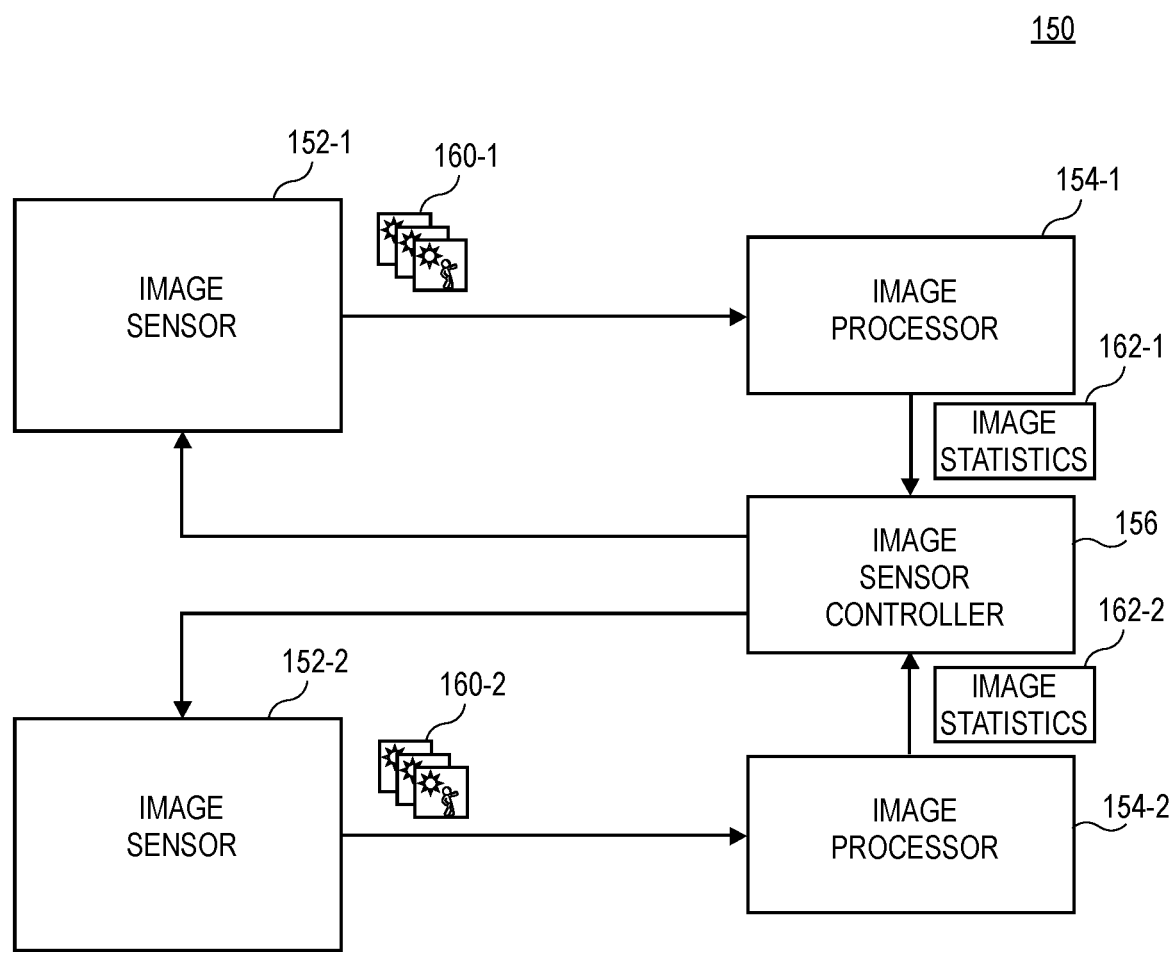
FIG. 1B is a block diagram of an exemplary exposure control system, according to exemplary embodiments of the present disclosure.

FIG. 1B is a block diagram of an exemplary exposure control system 150 for determining exposure settings, according to exemplary embodiments of the present disclosure. In exemplary implementations, exposure control system 150 may be utilized in connection with any imaging devices employed by a machine vision system, such as imaging devices 122-1 and 122-2, to make determinations of exposure settings to ensure proper exposure of captured images.

As shown in FIG. 1B, exposure control system 150 may include image sensors 152-1 and 152-2, image processors 154-1 and 154-2, and image sensor controller 156. Although the various components of exposure control system 150 are shown as discrete blocks, exposure control system 150 may be implemented as various combinations of hardware and/or software components, including, but not limited to processors, ASICs, FPGAs, PLDs, SoCs, and the like. According to aspects of the present disclosure, image sensors 152-1 and 152-2 may be configured as a stereo pair of imaging devices which captures image streams 160-1 and 160-2. Image streams 160-1 and 160-2 may be provided to image processors 154-1 and 154-2, respectively, which may process one or more frames of image streams 160-1 and 160-2 to determine certain image statistics and/or parameters 162-1 and 162-2, respectively. Image statistics and/or parameters 162-1 and 162-2 may be provided to image sensor controller 156, which can be configured to determine, based on image statistics and/or parameters 162-1 and 162-2, exposure settings such as exposure time and gain for imaging sensors 152-1 and 152-2. The determined exposure settings may be applied to imaging sensors 152-1 and 152-2 to ensure proper exposure of the images captured by imaging sensors 152-1 and 152-2.

Figure 2A:
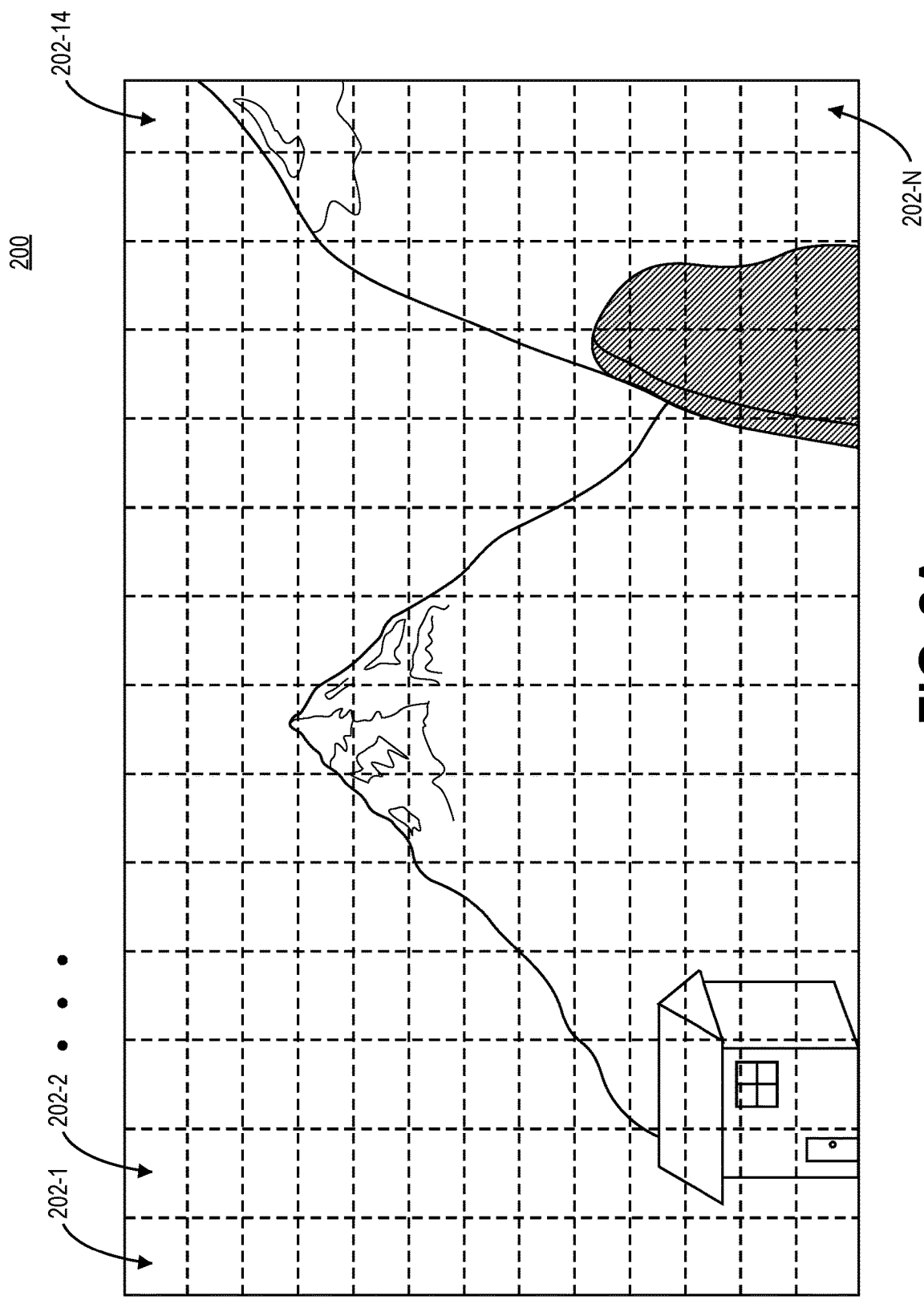
FIG. 2A is an illustration of an exemplary partitioned image, according to exemplary embodiments of the present disclosure.

According to embodiments of the present disclosure, one or more frames of image streams 160-1 and 160-2 may be processed (e.g., by image processors 154-1 and 154-2) to determine image statistics and/or parameters, such as an aggregated exposure value for the one or more frames of image streams 160-1 and 160-2. Initially, a frame may be partitioned into a plurality of zones that may encompass a respective area of the image. FIG. 2A illustrates an exemplary image 200 that has been partitioned into 182 uniformly distributed zones 202-1, 202-2, to 202-N (i.e., 13 by 14 zones), according to exemplary embodiments of the present disclosure. According to certain embodiments, the image presented in the frame may be partitioned into a grid of 1024 uniformly sized zones (e.g., a 32 by 32 grid of zones). Alternatively and/or in addition, the image presented in the frame may be partitioned into more or less zones (e.g., based on the desired resolution of the zones, etc.), and/or the image presented in the frame may be partitioned into non-uniformly sized zones. For example, areas of the frame requiring less resolution (e.g., relatively less important areas of the frame such as open sky, the sun, areas that will have a lesser impact on exposure values, etc.) may be partitioned into fewer, larger zones, while areas of the frame requiring more resolution (e.g., relatively more important areas of the frame, areas that will have a greater impact on exposure values, etc.) may be partitioned into more, smaller zones.

After the image has been partitioned into a plurality of zones, a spatial weighting of the zones may be determined based on the relative importance (e.g., with respect to exposure values) of each zone. Determination of spatial weights is described in further detail herein. For example, the weights for each of the zones may be determined based on various parameters associated with the image, information included in the image, the imaging sensors that captured the image, the purpose of the machine vision system employing the imaging sensors, and the like. According to one exemplary embodiment of the present disclosure, weighting of the zones may be based on static information associated with the imaging devices and/or the environment in which the imaging devices are operating. This may include static information such as the known orientation and purpose of the imaging devices for which the exposure settings are being determined. In the example implementation illustrated in FIG. 1A, which shows UAV 120 having imaging devices 122-1 and 122-2, assuming that the primary purposes of imaging devices 122-1 and 122-2 are for navigation, guidance, and collision avoidance, zones closer to and including the scene around the horizon may have greater relative importance, and therefore greater weights, compared to other zones in the image that primarily correspond to other features in the image (e.g., the sun, the sky, etc.). In another exemplary implementation of weighting based on static information, downward facing cameras that have a primary purpose of surveillance and/or monitoring may place greater importance (and a greater weight) on zones toward the center of the image compared to zones on the edges of the image based on the assumption that zones toward the periphery may have a greater likelihood of imaging the sun, reflections, and the like. Accordingly, it may be desirable to assign lower weights to zones disposed at the edges of the image for purposes of exposure as they may be more affected by images of the sun, reflections, etc. According to other exemplary implementations, higher weights may be assigned to zones imaging ground features relative to zones imaging the sky. Accordingly, the higher and lower weights may be assigned to the zones of a partitioned image based on the function, purpose, orientation, etc. of the imaging devices.

Other parameters may also be considered in determining and assigning the weights to the various zones. For example, dynamic external information may be considered in determining and assigning weights to each zone. In the example implementation illustrated in FIG. 1A of UAV 120 and imaging devices 122-1 and 122-2, information may be obtained from other sensors of UAV 120, such as global positioning system (GPS) sensors, inertial measurement units (IMU), gyroscopes, speed sensors, altimeters, magnetometers, and the like. Information from these sensors may facilitate determinations regarding the location and positioning of the imaging sensors. Sensor information such as the angle of the horizon, position of the horizon (e.g., vertical), and the like may be received from the various sensors of UAV 120. Based on the sensor information, the position of certain features, such as the sun, the horizon, etc. may be determined, and based on the purpose of the imaging sensors, weights can be determined and assigned to each of the zones based on relative importance of each zone. For example, the zones including an image of the sun may be considered to be of lesser importance with respect to determining exposure values and may be assigned a lower weight. Further, as UAV 120 navigates and maneuvers during its operation in the environment, information from the various sensors can continuously and dynamically facilitate determination of the relative position of features such as the sun, horizon, and the like.

According to yet another aspect of the present disclosure, image information may also be used to determine and assign weights for each zone in the image. The images can be processed using known image processing algorithms (e.g., image segmentation, edge detection, object detection, etc.) to detect certain features in the images, which can be used to determine and assign weights to each zone in the image. For example, features such as the sky, horizon, sun, structures, and the like can be detected within the images, and weights for each of the zones can be determined and assigned based on the positioning of the detected features within the image. Zones in the image where the sun and sky have been detected may be assigned a lower weight, whereas zones where objects (e.g., for collision avoidance, navigation, guidance, etc.) have been detected may be assigned a higher weight. Alternatively and/or in addition, information content in each of the zones may also be used in determining the weights for each of the zones. For example, the image may be transformed into the frequency domain and each of the zones may be analyzed for high frequency content, vertical edge content, horizontal edge content, and the like. Based on the analysis, weights may be determined and analyzed for each of the zones such that zones having higher frequency content and/or greater edge content may be assigned higher weights.

Figure 2B:
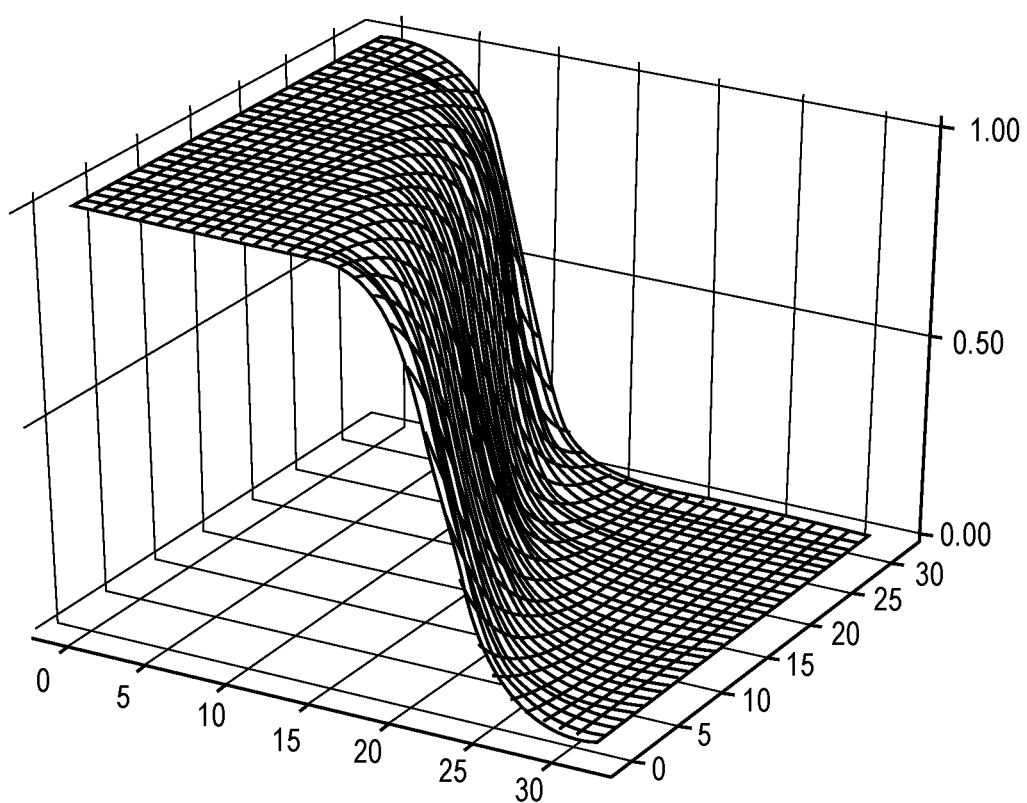
FIG. 2B is an illustration of an exemplary normalized weight matrix, according to exemplary embodiments of the present disclosure.

According to embodiments of the present disclosure, the spatial weighting of the zones may be based on any combination of the above-described considerations in determining and assigning weights to each of the zones. For example, one or more of the above-described considerations can facilitate determination of a normalized weight matrix to prioritize certain portions (e.g., the horizon, ground features, etc.) of the image over other portions (e.g., the sun, reflections, etc.) of the image. FIG. 2B shows an exemplary normalized weight matrix 250, according to exemplary embodiments of the present disclosure. As shown in FIG. 2B, prioritized zones may be assigned a normalized weight of one, whereas areas that are not prioritized may be assigned a normalized weight of zero. Alternatively and/or in addition, one or more of the above-described considerations may be used to determine a mask layer specifying normalized multipliers that may be applied to a weight matrix. According to certain aspects, a static normalized weight matrix may be determined based on the static information associated with the imaging sensors, and one or more masks layers specifying normalized multipliers may be determined in view of dynamic external information and/or the image information. Accordingly, a final weighting may be determined based on a combination of the static normalized weight matrix and the one or more mask layers. Further, the weighting may be applied on a frame-by-frame basis as the scene may be continuously changing as UAV 120 is operating.

Figure 2C:
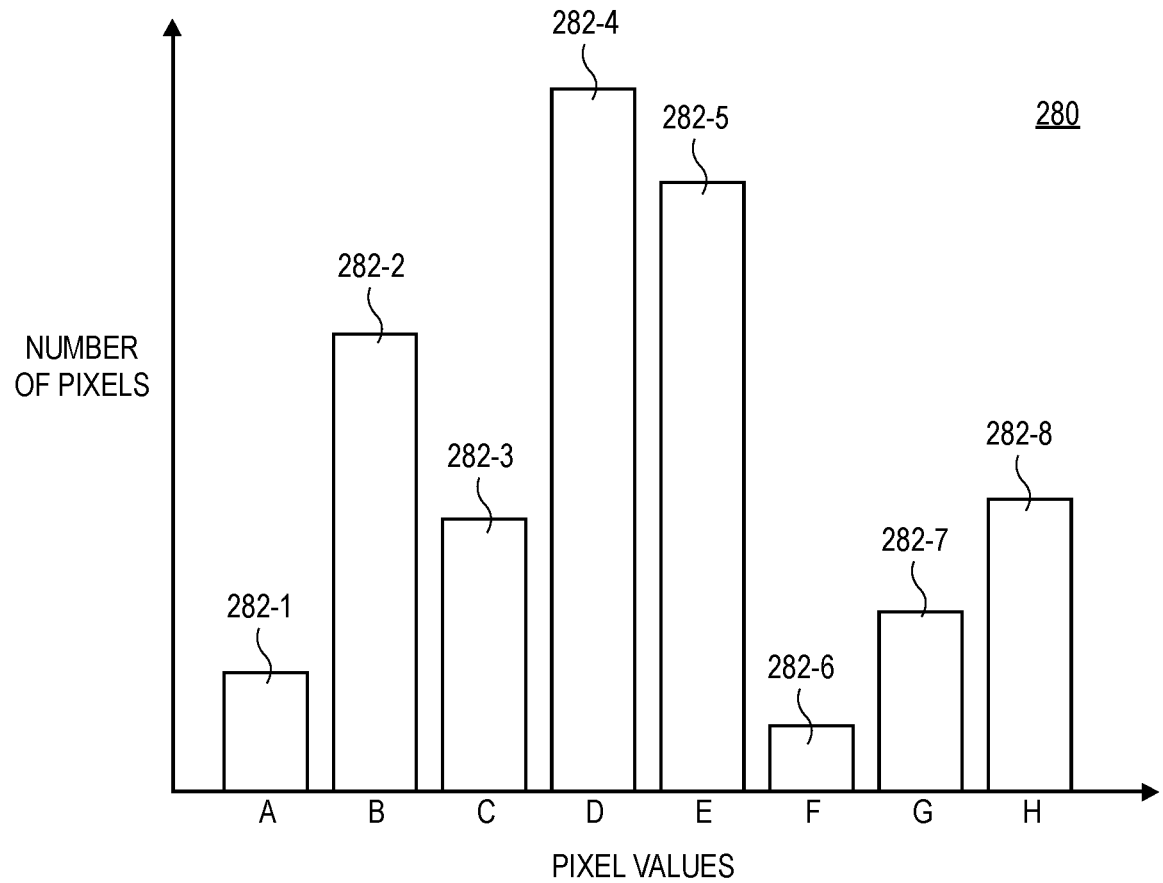
FIG. 2C is an illustration of an exemplary non-uniformly distributed histogram, according to exemplary embodiments of the present disclosure.

According to embodiments of the present disclosure, the pixels of each zone of the image may be analyzed to determine image statistics and/or parameters 162-1 and 162-2 associated with the image. For example, the pixel values of each pixel in each zone may be non-uniformly sorted into a histogram representing the distribution of pixels in each zone. FIG. 2C illustrates an exemplary non-uniformly distributed histogram 280, according to exemplary embodiments of the present disclosure.

In sorting the pixels into a non-uniformly distributed histogram, bins for the pixel values may first be determined. The pixel values may be separated into any number of bins (e.g., 2, 3, 4, 5, 6, 7, 8, 10, 15, etc.) to the extent that it would not be computationally prohibitive. Preferably, the bins at the edges of the histogram may correspond to a narrower band of pixel values to provide more resolution at the edges of the histogram, and the bins toward the middle of the histogram may correspond to a wider band of pixel values. This non-uniform distribution of pixel values may be desirable to provide greater resolution in connection with overexposed pixels (e.g., bins at the higher end of the histogram) and underexposed pixels (e.g., bins at the lower end of the histogram) since pixel values towards the middle of the histogram may correspond to pixels that are (or closer to being) properly exposed. According to aspects of the present disclosure and as shown in FIG. 2C, the pixel values (i.e., the horizontal axis in histogram 280) may be separated into eight non-uniformly distributed bins. In an exemplary implementation where each pixel value may be represented by 12-bits such that each pixel may have a value between 0 and 4095, the bins may be defined as follows: bin 1 may correspond to pixel values 0 to 127; bin 2 may correspond to pixel values 128 to 255; bin 3 may correspond to pixel values 256 to 511; bin 4 may correspond to pixel values 512 to 1023; bin 5 may correspond to pixel values 1024 to 2047; bin 6 may correspond to pixel values 2048 to 3583; bin 7 may correspond to pixel values 3584 to 4031; and bin 8 may correspond to pixel values 4032 to 4095. As shown in FIG. 2C, histogram 280 may provide histogram values 282-1, 282-2, 282-3, 282-4, 282-5, 282-6, 282-7, and 282-8, which represent the distribution of pixels in each zone that have a pixel value in the range defined by each bin. In the example implementation of an eight-bin histogram with pixel values represented by 12-bits, the distribution of pixel values for each zone may be represented as:

$$h(z, b) = \sum_{x(z)} \sum_{y(z)} C\{p(x, y), l(b), l(b+1)\}$$

where b is the bin index, b∈{0, 7} h(z, b) is the histogram value for bin b, zone z; C {p, min, max}=1, if (min≤p≤max) and 0 otherwise; x(z) and y(z) are the horizontal and vertical pixel ranges pertinent to zone z; and I(b) are the bin boundaries (e.g., I=[0,128,256, 512, 1024, 2048, 3584, 4032, 4096]).

After the histograms have been generated for each zone, the histogram values for each zone can be aggregated to determine an aggregated exposure value, which may represent an aggregated exposure value for the image. In the example implementation of an eight-bin histogram with pixel values represented by 12-bits, the aggregated exposure value may be represented as:

$$\sum_{z=1}^{1024} \sum_{b=1}^{8} c(b)h(z, b)v(b)w(z)$$

where h(z, b) is the histogram value for bin b, zone z; v(b) are programmable histogram weights which are internally normalized to 1, such that $\Sigma_{b-1}^{8} v(b)=1$; w(z) are the normalized zone spatial weights, such that $\Sigma_{z=1}^{1024} w(z)=1$; and c(b) are pixel values specific to the bins, where c={0, 192,384, 768, 1536, 2816, 3808, 4095}. The histogram weights allow weighting different parts of the histogram to prioritize different objectives. For example, a weighting to minimize saturation of pixels may provide higher weights to bins toward the higher (e.g., saturated) end of the histogram, and may be represented as:

$$v(b) = \frac{1}{489}\{1, 2, 4, 8, 32, 64, 128, 250\}$$

Alternatively and/or in addition, a weighting to balance overexposure and underexposure may provide lower weights to bins in the middle of the histogram, and may be represented as:

$$v(b) = \frac{1}{135}\{8, 4, 2, 1, 8, 16, 32, 64\}$$

After the aggregated exposure value has been determined for the image, the aggregated exposure value may be utilized to drive the exposure setting toward a target exposure value. For example, if the aggregated exposure value for the image is above the target exposure value (i.e., overexposed relative to the target exposure value), a lower exposure value may be determined and applied to image sensors 152-1 and 152-2 in connection with the next image or frame that is to be captured by image sensors 152-1 and 152-2 in stream of images 160-1 and 160-2. Alternatively, if the aggregated exposure value for the image is below the target exposure value (i.e., underexposed relative to the target exposure value), a higher exposure value may be determined and applied to image sensors 152-1 and 152-2 in connection with the next image or frame that is to be captured by image sensors 152-1 and 152-2 in the stream of images 160-1 and 160-2. The exposure values utilized by embodiments of the present disclosure may include a generalized exposure, which may include an exposure time component and a gain component. According to exemplary embodiments of the present disclosure, the generalized exposure may be represented as $10^{ag/20}$, where $T_{exp}$ is the exposure time and ag is the analog gain, which may be a unitless logarithmic scalar applied by one or more amplifiers in the image sensor.

Figure 3A:
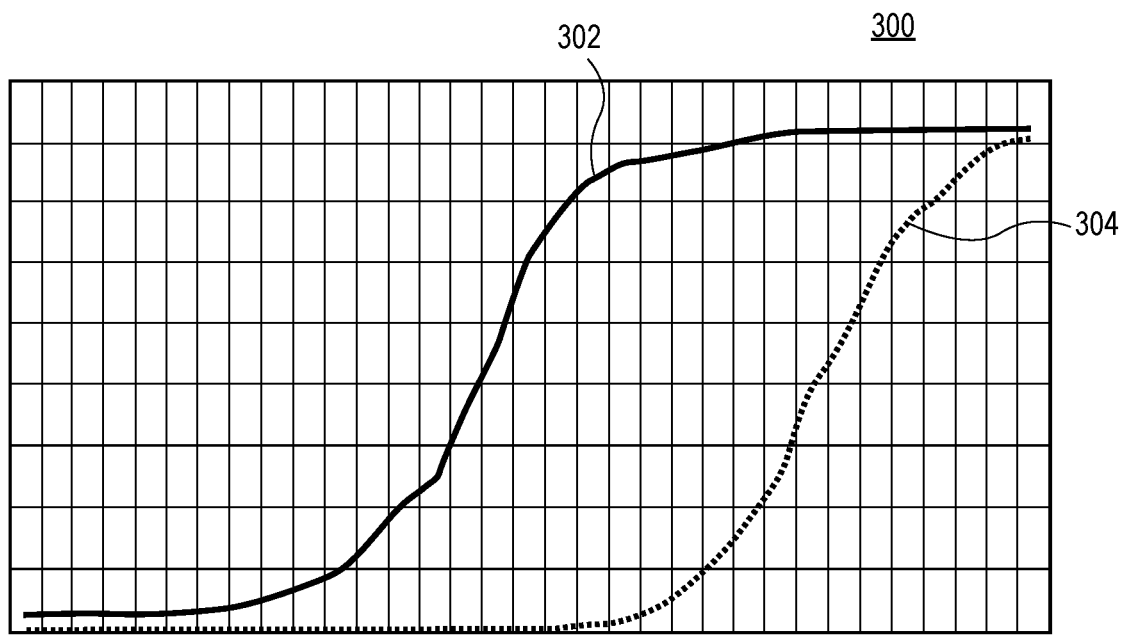
FIG. 3A is an illustration of an exemplary plot of exemplary response functions, according to exemplary embodiments of the present disclosure.

According to exemplary embodiments of the present disclosure, the exposure value may be determined based on the aggregated exposure value and an image sensor response function (e.g., aggregated exposure value vs. log (exposure)). Although a response function associated with an image sensor may shift based on illumination conditions, the shape of the response function is typically substantially scene-invariant. FIG. 3A illustrates an exemplary plot 300 of exemplary response functions (e.g., aggregated exposure value vs. log (exposure)) associated with an image sensor, according to exemplary embodiments of the present disclosure. As shown in FIG. 3A, response functions 302 and 304 may represent response functions of an imaging sensor operating in different illumination conditions. For example, response function 302 may represent the response of the imaging sensor in relatively bright illumination conditions (e.g., outdoors), while response function 304 may represent the response of the imaging sensor in darker illumination conditions (e.g., indoors). As illustrated in FIG. 3A, although response functions 302 and 304 are shifted along the horizontal axis based on illumination conditions, the overall shape of response functions 302 and 304 is substantially similar.

Accordingly, based on an assumption that the shape of a response function associated with a given image sensor may be substantially scene invariant, the response function may be used in connection with the target exposure value and the aggregated exposure value to determine an exposure value for the imaging devices. For example, the error between the aggregated exposure value and the target value in view of the response function may be determined, and the aggregated exposure value can be adjusted with a factor that is proportional to the error in determining the exposure value. Determination of the exposure value using the response function, the target exposure value, and the aggregated exposure value can effectively be viewed as a search using the response function, the target exposure value, and the aggregated exposure value. According to exemplary embodiments of the present disclosure, the polynomial approximation to the inverse of the response function shown in FIG. 3A may be represented as:

$$d(x_k) = \alpha x_k^3 + b x_k + c$$

where $\alpha = -10^{-10}$; $b = -10^{-3}$; $y_k$ represents the aggregated exposure value; $t_k$ represents that target exposure value; $x_k$ represents the error between the aggregated exposure value and the target (e.g., $x_k = y_k - t_k$, C=0). Thus, in determining the exposure value, it is desirable to minimize $x_k$ to determine a relative adjustment from the aggregated exposure value. In an exemplary implementation where the exposure value may be determined based on the aggregated exposure values of the previous two images/frames in the stream of images, minimizing $x_k$ may be represented as:

corr=exp(d($x_k$)), when $x_k x_{k-1} > 0$ (i.e., when the aggregated exposure values of the previous two images/frames are on the same side of the target exposure value); or $$corr = \frac{1}{e_k} \frac{e_{k-1} x_k - e_k x_{k-1}}{x_k - x_{k-1}},$$

otherwise, where $e_{k+1}=e_k \text{corr}^{1-damp/260}$ where damp is an integer control variable that allows balancing stability with convergence speed.

Figure 3B:
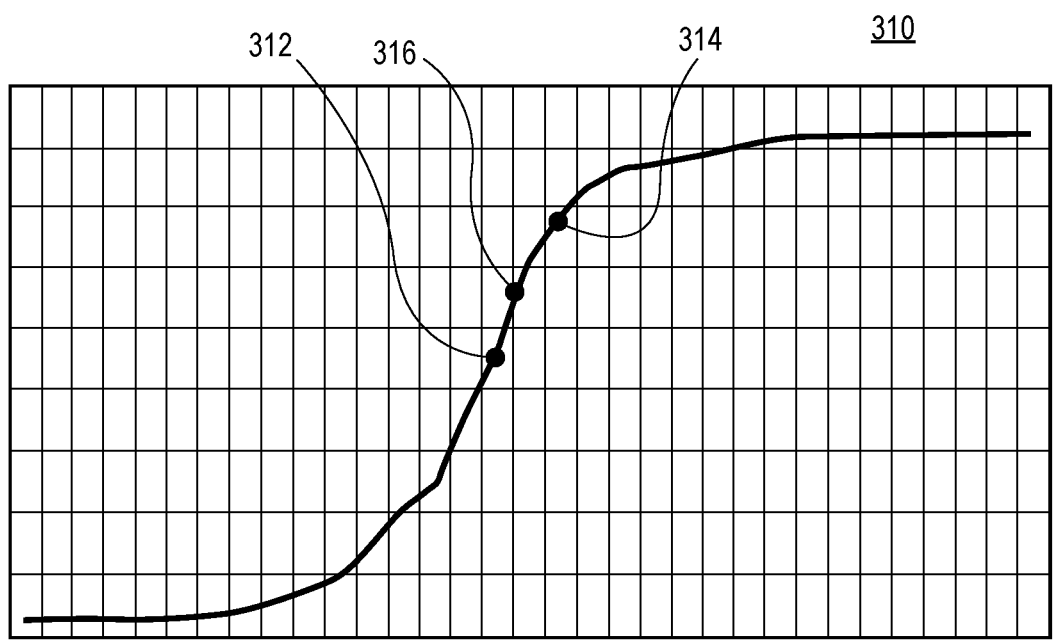
FIGS. 3B, 3C, and 3D are illustrations of exemplary determinations of an exposure value based, according to exemplary embodiments of the present disclosure.
Figure 3C:
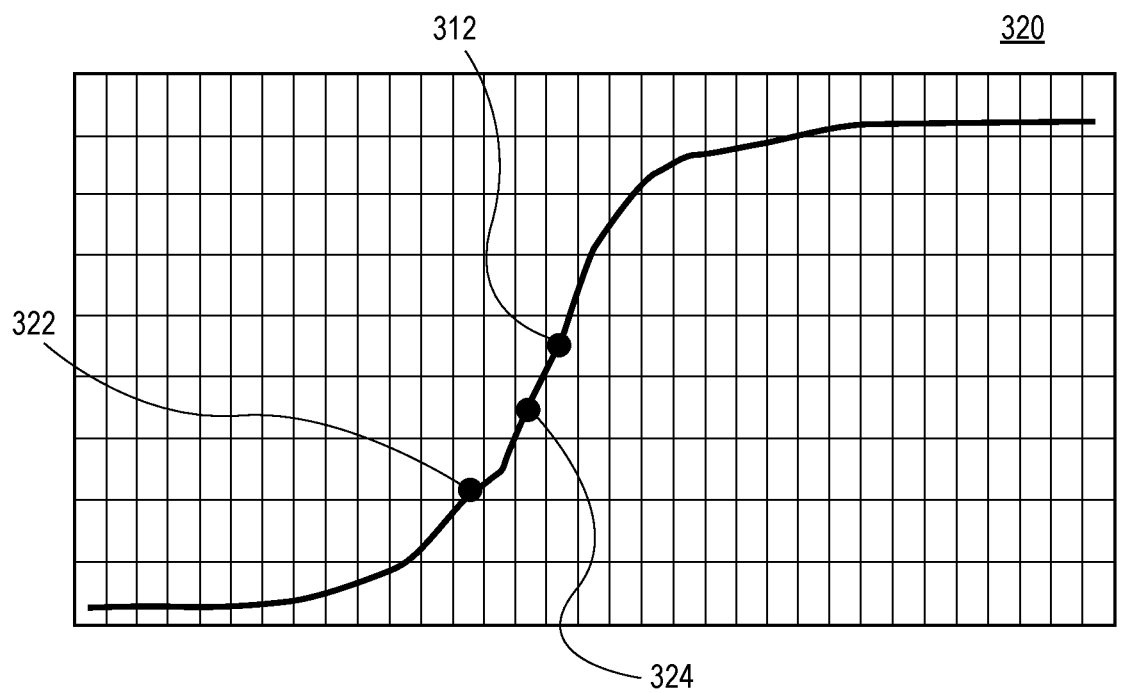
Figure 3D:
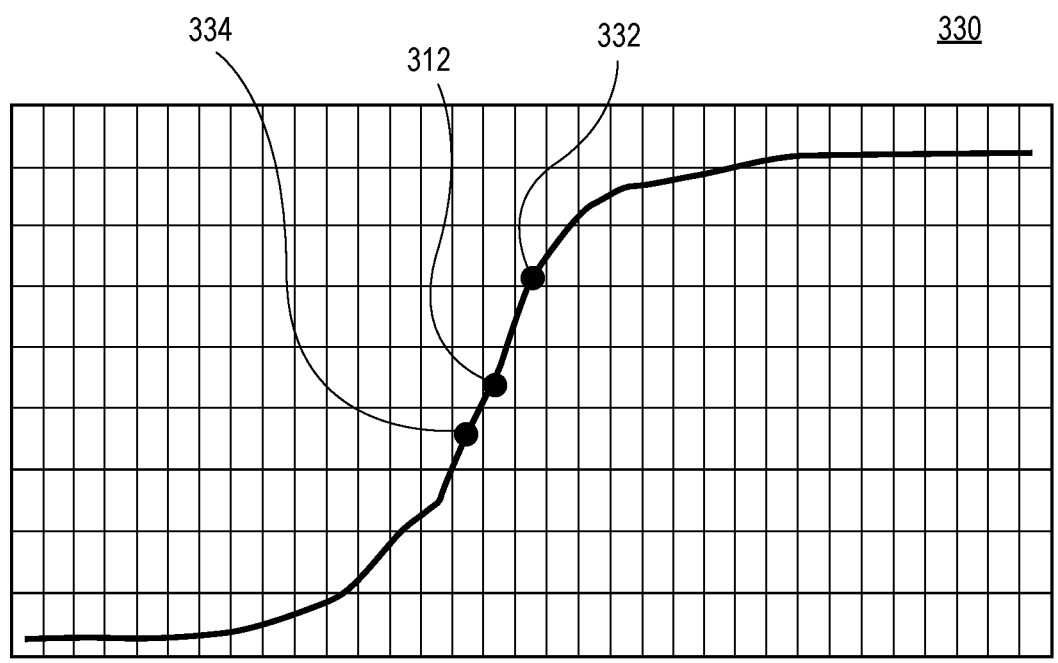

FIGS. 3B, 3C, and 3D illustrate exemplary determinations of an exposure value based on the aggregated exposure values of the previous two images/frames in the stream of images, according to exemplary embodiments of the present disclosure.

FIGS. 3B, 3C, and 3D illustrate exemplary plots 310, 320, and 330 depicting an imaging response function with a target exposure value and aggregated exposure values. The aggregated exposure values may have been determined in accordance with embodiments of the present disclosure in connection with the previous two images/frames from the stream of images, and, as shown in FIGS. 3B, 3C, and 3D, the aggregated exposure values are plotted relative to target exposure value 312 on the response function. According to aspects of the present disclosure, the exposure setting for each frame in the stream of images may be determined based on a response function, the aggregated exposure values associated with the previous two frames, and the target exposure value.

FIG. 3B illustrates an exemplary implementation where an exposure value for a frame in a stream of images is determined on the previous two aggregated exposure values (e.g., aggregated exposure values 314 and 316) where the aggregated exposure values have values that are above (e.g., more exposed) target exposure value 312. For example, aggregated exposure value 314 may have been determined based on one or more frames from the stream of images and aggregated exposure value 316 may have been determined based on the subsequent frame(s) in the stream of images. The exposure value utilized in connection with the images associated with aggregated exposure values 314 and 316 may have been determined based on an analysis of the respective preceding frames in accordance with embodiments of the present disclosure. Accordingly, as shown in FIG. 3B, each subsequent exposure value may be driven toward target exposure value 312.

According to aspects of the present disclosure, the exposure value for the next frame in the stream of images may be determined based on the response function, aggregated exposure values 314 and 316, and target exposure value 312. For example, the exposure value for the next frame may be a relative adjustment of the exposure values utilized in connection with the previous frames that is proportional to the exposure error (e.g., exposure value vs. target exposure value) based on the response function. As noted above, determination of the exposure value may be represented as:

corr=exp($d(x_k)$)

The determined exposure value may be used to adjust the settings of the imaging device in capturing the next frame in the stream of images. Accordingly, the process of determining exposure values may be continuously and iteratively performed to determine an exposure value to facilitate adjusting the exposure settings for the imaging device image for each successive frame in the frame of images.

FIG. 3C illustrates an exemplary implementation where an exposure value for a frame in a stream of images is determined on the previous two aggregated exposure values (e.g., aggregated exposure values 322 and 324) where the aggregated exposure values have values that are less (e.g., less exposed) than target exposure value 312. For example, aggregated exposure value 322 may have been determined based on one or more frames from the stream of images and aggregated exposure value 324 may have been determined based on the subsequent frame(s) in the stream of images. The exposure value utilized in connection with the images associated with aggregated exposure values 322 and 324 may have been determined based on an analysis of the respective preceding frames in accordance with embodiments of the present disclosure. Accordingly, as shown in FIG. 3C, the exposure values may be driven toward target exposure value 312.

According to aspects of the present disclosure, the exposure value for the next frame in the stream of images may be determined based on the response function, aggregated exposure values 322 and 324, and target exposure value 312. For example, the exposure value for the next frame may be a relative adjustment of the exposure values utilized in connection with the previous frames that is proportional to the exposure error (e.g., exposure value vs. target exposure value) based on the response function. As noted above, determination of the exposure value may be represented as:

corr=exp($d(x_k)$)

The determined exposure value may be used to adjust the settings of the imaging device in capturing the next frame in the stream of images. Accordingly, the process of determining exposure values may be continuously and iteratively performed to determine an exposure value to facilitate adjusting the exposure settings for the imaging device image for each successive frame in the frame of images.

FIG. 3D illustrates an exemplary implementation where an exposure value for a frame in a stream of images is determined on the previous two aggregated exposure values (e.g., aggregated exposure values 332 and 334) where the aggregated exposure values have values that are on opposite sides of target exposure value 312 (i.e., one aggregated exposure value is greater than the target exposure value and one aggregated exposure is less than the target exposure value). For example, aggregated exposure value 332 may have been determined based on one or more frames from the stream of images and aggregated exposure value 334 may have been determined based on the subsequent frame(s) in the stream of images. The exposure value utilized in connection with the images associated with aggregated exposure values 332 and 334 may have been determined based on an analysis of the respective preceding frames in accordance with embodiments of the present disclosure. Accordingly, as shown in FIG. 3D, the exposure values may be driven toward target exposure value 312.

According to aspects of the present disclosure, the exposure value for the next frame in the stream of images may be determined based on the response function, aggregated exposure values 332 and 334, and target exposure value 312. For example, the exposure value for the next frame may be determined utilizing an interpolation algorithm (e.g., the secant method, etc.) to determine a relative adjustment of the exposure values utilized in connection with the previous frames. As noted above, determination of the exposure value may be represented as:

$$corr = \frac{1}{e_k} \frac{e_{k-1}x_k - e_k x_{k-1}}{x_k - x_{k-1}}, \text{ where}$$

$$e_{k+1} = e_k corr^{1-damp/260}$$

where damp is an integer control variable that allows balancing stability with convergence speed. The determined exposure value may be used to adjust the settings of the imaging device in capturing the next frame in the stream of images. Accordingly, the process of determining exposure values may be continuously and iteratively performed to determine an exposure value to facilitate adjusting exposure settings for the imaging device for each successive frame in the frame of images.

After the exposure value has been determined, a priority may be determined in connection with the parameter settings in connection with obtaining the determined exposure value. As described herein, the determined exposure value may be a generalized exposure, which may include an exposure time component and a gain component. Accordingly, the same exposure value may be obtained by different combinations of exposure times and gain settings. The exposure time and gain settings may be determined based on conditions associated with capturing of the image. For example, in capturing scenes including fast motion, gain is typically increased and exposure time is typically reduced to reduce blur. Conversely, for substantially stationary scenes, exposure time is typically increased and gain is typically reduced to reduce the introduction of Gaussian noise.

Figure 4A:
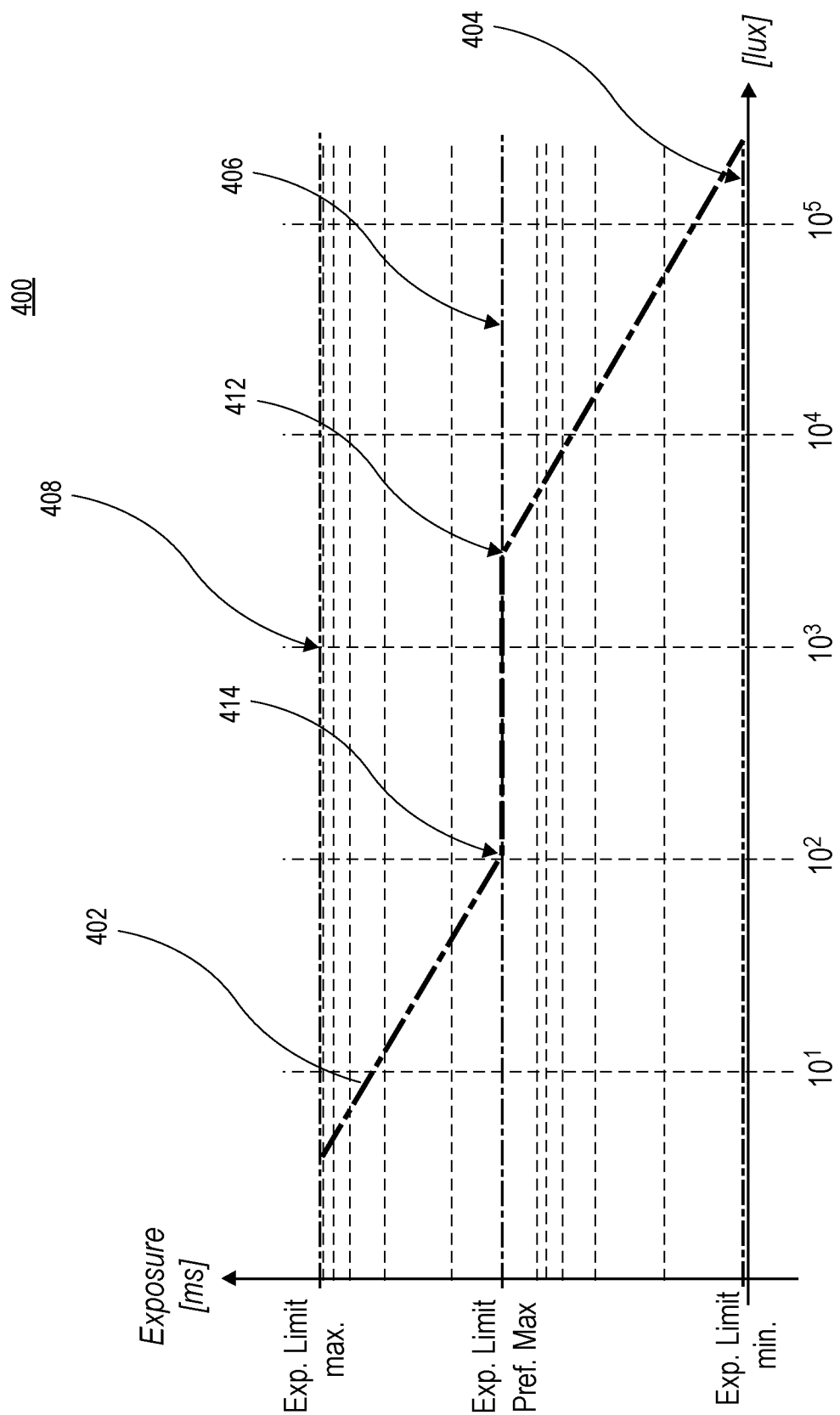
FIGS. 4A and 4B are illustrations of exemplary exposure time-gain response functions, according to exemplary embodiments of the present disclosure.
Figure 4B:
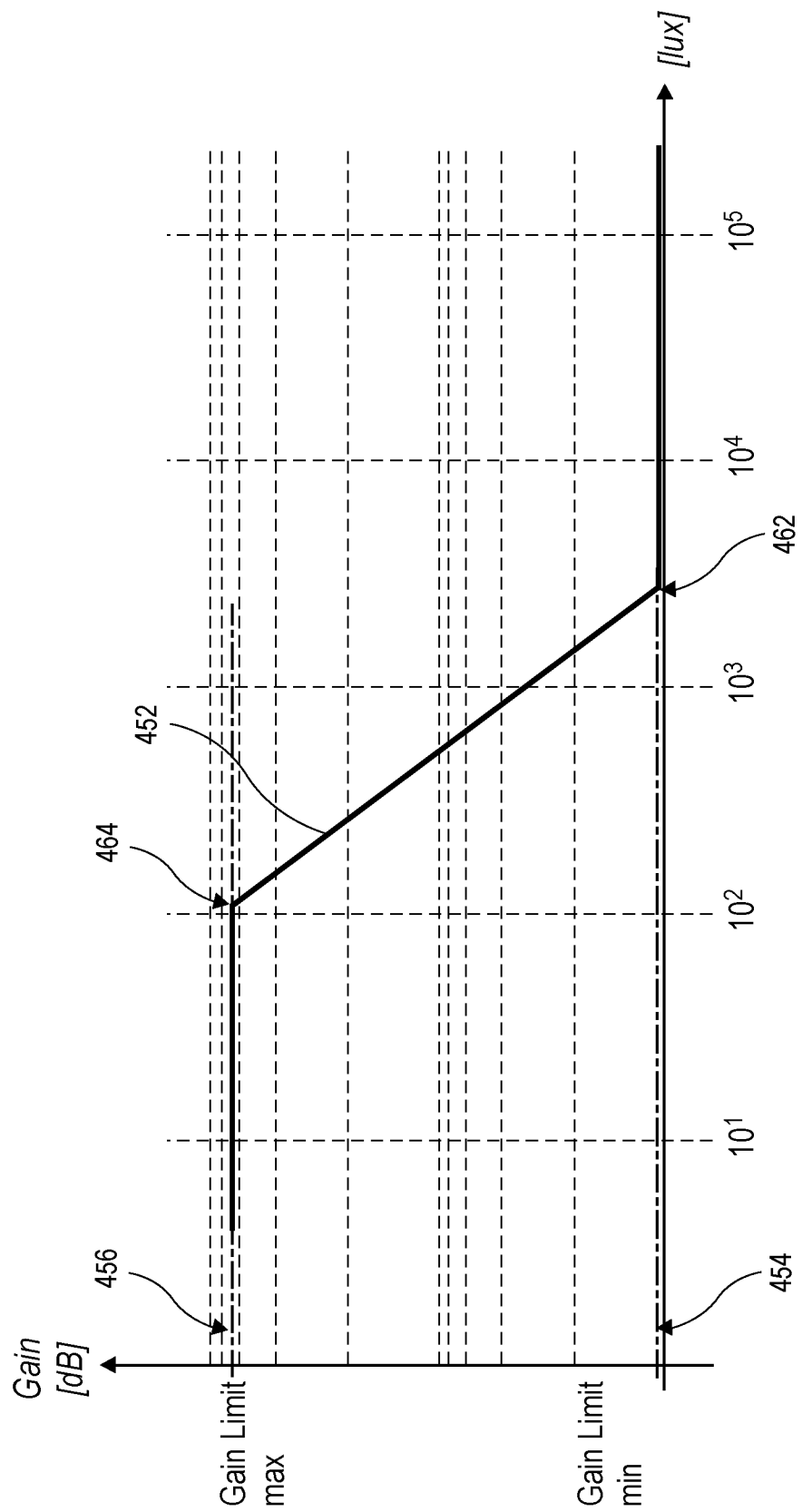

Embodiments of the present disclosure can provide exposure time and analog gain priority as shown in exemplary exposure time and gain response functions 400 and 450, as shown in FIGS. 4A and 4B.

FIG. 4A illustrates an exemplary exposure time response function 400 according to exemplary embodiments of the present disclosure and FIG. 4B illustrates an exemplary analog gain response function 450 according to exemplary embodiments of the present disclosure. In the exemplary implementation illustrated in FIG. 4A, exposure time response function 400 illustrates a plot of exposure time 402 against illumination conditions. Similarly, FIG. 4B shows analog gain response function 450, which plots analog gain 452 against illumination conditions. As shown in FIGS. 4A and 4B, response functions 400 and 450 both include transition points 412 and 414 and 462 and 464, respectively. As shown in FIGS. 4A and 4B, transition point 412 of response function 400 corresponds to transition point 462 of response function 450, and transition point 414 of response function 400 corresponds to transition point 464 of response function 450.

As shown in FIG. 4A, under bright illumination conditions, exposure time 402 may be established at minimum exposure limit 404. This may correspond to a minimum exposure time that is associated with and/or achievable by the image sensor. Accordingly, as illumination conditions become relatively darker, exposure time 402 may be decreased until transition point 412 is reached. At transition point 412, exposure time 402 may include preferred maximum exposure limit 406. Preferred maximum exposure limit 406 may correspond to a preferred maximum exposure time value to minimize motion blur associated with captured images. Exposure time 402 may be held constant at preferred maximum exposure limit 406 as illumination conditions become progressively darker (and generalized exposure may be controlled by varying gain while exposure time is held constant), until transition point 414 is reached. At transition point 414, exposure time 402 may again be increased in view of darkening illumination conditions until maximum exposure limit 408 is reached. Maximum exposure limit 408 may correspond to a maximum exposure time that is associated with and/or achievable by the image sensor.

Correspondingly, as shown in FIG. 4B, under bright illumination conditions, analog gain 452 may be held constant at minimum gain limit 454 under bright illumination conditions (while generalized exposure is controlled by varying exposure time). This may correspond to a minimum analog gain that is associated with and/or achievable by the image sensor. Accordingly, as illumination conditions become relatively darker, analog gain 452 may be held constant until transition point 462 is reached. At transition point 462, analog gain 452 may be increased (while exposure time may be held constant—e.g., at preferred maximum exposure limit 406) as illumination conditions get progressively darker. Analog gain 452 may continue to be increased as illumination conditions become progressively darker until transition point 464 is reached. At transition point 464, analog gain 452 may again be held constant (while generalized exposure is again controlled by varying exposure time) at maximum gain limit 456. Maximum gain limit 456 may correspond to a maximum exposure time that is associated with and/or achievable by the image sensor.

When considering response function 400 and 450 together, as shown in FIGS. 4A and 4B, for illumination conditions above transition point 412/462, analog gain 452 may be held constant (e.g., at minimum gain limit 454) while exposure time 402 is adjusted to control adjustment of the generalized exposure value. Similarly, for illumination conditions below transition point 414/464, analog gain 452 may again be held constant (e.g., at maximum gain limit 456) while exposure time 402 is adjusted to control adjustment of the generalized exposure value. However, for illumination conditions between transition points 412/462 and 414/464, exposure time 402 may be held constant (e.g., at preferred maximum exposure limit 406) while analog gain 404 is adjusted to control adjustment of the generalized exposure value.

Further, exemplary embodiments of the present disclosure provide adjusting of transition points 412/462 and 414/464 based on certain parameters associated with the scene. For example, in the exemplary implementation illustrated in FIG. 1A, which shows UAV 120 having imaging devices 122-1 and 122-2, transition points 412/462 and 414/464 may be determined based on information received from sensors aboard UAV 120. Information received from sensors, such as GPS sensors, an IMU, gyroscopes, speed sensors, altimeters, etc., can provide information regarding operation of UAV 120, which may be used to determine transition points 412/462 and 414/464. For example, the sensor information can facilitate determination of the speed, turning rate, climbing rate, descending rate, banking rate/angle, vibration, etc., which can be used to determine threshold values for the rate of change of the scene surrounding UAV 120 to facilitate determination of transition points 412/462 and 414/464. Accordingly, based on the exposure time-gain response function, an exposure-time vs. gain priority may be determined and applied to the exposure value to generate exposure settings (e.g., exposure time and gain) for the imaging devices.

Figure 5:
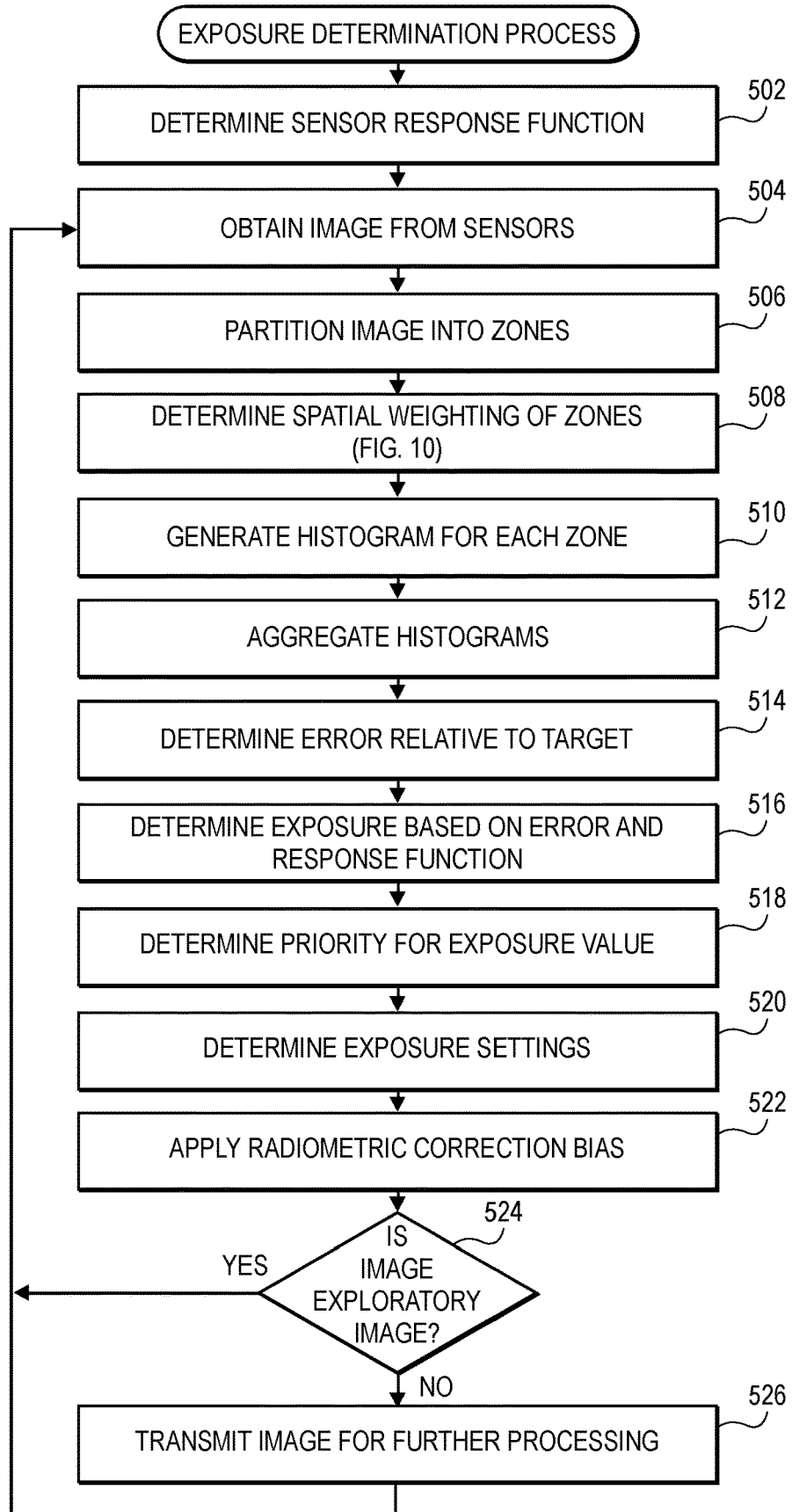
FIG. 5 is a flow diagram of an exemplary exposure determination process, according to exemplary embodiments of the present disclosure.

FIG. 5 illustrates an exemplary exposure determination process 500, according to exemplary embodiments of the present disclosure. According to certain exemplary implementations, process 500 may be performed by a processing arrangement and/or control system (e.g., control system 150).

As shown in FIG. 5, process 500 may begin with determining a sensor response function (e.g., shown in FIG. 3A) associated with the imaging sensor (e.g., image sensor 152-1 and/or 152-2) being utilized, as in step 502. As described herein, the shape of a response function associated with an imaging sensor is typically substantially scene-invariant. Accordingly, although the response function may shift along the horizontal axis based on illumination conditions (e.g., brighter vs. darker conditions), the general shape of the response function is typically scene-invariant. The response function may be utilized to facilitate determination of exposure values for the imaging sensor. Although shown in FIG. 5 as the initial step in process 500, determination of the sensor response function may be performed at any point during process 500 prior to determination of the exposure value.

In step 504, an image may be obtained from the image sensor. According to exemplary embodiments of the present disclosure, the image may be a frame in a stream of images (e.g., stream of images 160-1 and/or 160-2) obtained by the image sensor. For example, the obtained image may be an image in a stream of images captured by imaging devices (e.g., imaging devices 122-1 and/or 122-2) disposed on a UAV (e.g., UAV 120) to capture the scene/environment around the UAV in which they UAV may be operating. The images captured by the imaging devices may be used for navigation, guidance, collision avoidance, or any other purpose.

The image captured in step 504 may then be partitioned into a plurality of zones, as in step 506. According to embodiments of the present disclosure, the image may be partitioned into any number of uniformly or non-uniformly distributed zones. For example, the image may be partitioned into a grid of 1024 uniformly sized zones (e.g., a 32 by 32 grid of zones). Alternatively and/or in addition, the image presented in the frame may be partitioned into more or less zones (e.g., based on the desired resolution of the zones, etc.), and/or the image presented in the frame may be partitioned into non-uniformly sized zones. For example, areas of the frame requiring less resolution (e.g., relatively less important areas of the frame such as open sky, the sun, areas that will have a lesser impact on exposure values, etc.) may be partitioned into fewer, larger zones, while areas of the frame requiring more resolution (e.g., relatively more important areas of the frame, areas that will have a greater impact on exposure values, etc.) may be partitioned into more, smaller zones. According to certain aspects of the present disclosure, the number of zones and whether the zones are uniformly or non-uniformly distributed may be dynamically based on the information contained in the image. For example, for an image where the relevant information is limited to a specific portion of the image, the zones may be non-uniformly distributed such that the portions having little relevant information are encompassed by a relatively low number of larger zones, while the portions of the image including the relevant information may be partitioned into a larger number of smaller zones.

Subsequent to partitioning of the image, spatial weighting of the zones may be determined, as in step 508. According to embodiments of the present disclosure, weights for each of the zones may be determined and assigned based on various parameters associated with the image, information included in the image, the imaging sensors that captured the image, the purpose of the machine vision system employing the imaging sensors, and the like. For example, the weights can be based on one or more of static information associated with the imaging devices and/or the environment in which the imaging devices are operating, dynamic external information, and/or image content information. The spatial weighting of the zones may be based on any combination of the various parameters and can facilitate determination of a normalized weight matrix to prioritize certain portions. Determination of spatial weights is described in further detail herein.

According to embodiments of the present disclosure, the pixels of each zone of the image may be analyzed to determine image statistics and/or parameters (e.g., image statistics and/or parameters 162-1 and 162-2) associated with the image. In determining the image statistics and/or parameters, histograms may be generated for each zone, as in step 510. According to embodiments of the present disclosure, the histogram for each zone may include a plurality of non-uniformly distributed bins. For example, the histogram may be generated having a fixed number of bins, and each bin may correspond to a different number of pixel values. According to an exemplary embodiment of the present disclosure, the histogram may include eight bins, and in an exemplary implementation where each pixel value may be represented by 12-bits such that each pixel may have a value between 0 and 4095, the bins may be defined as follows: bin 1 may correspond to pixel values 0 to 127; bin 2 may correspond to pixel values 128 to 255; bin 3 may correspond to pixel values 256 to 511; bin 4 may correspond to pixel values 512 to 1023; bin 5 may correspond to pixel values 1024 to 2047; bin 6 may correspond to pixel values 2048 to 3583; bin 7 may correspond to pixel values 3584 to 4031; and bin 8 may correspond to pixel values 4032 to 4095. Alternatively and/or in addition, the histogram generated for each zone may have any number of bins (e.g., 2, 3, 4, 5, 6, 7, 8, 10, 15, etc.) and may correspond to any range of pixel values. Preferably, the bins at the edges of the histogram may correspond to a narrower band of pixel values to provide more resolution at the edges of the histogram, and the bins toward the middle of the histogram may correspond to a wider band of pixel values. This non-uniform distribution of pixel values may be desirable to provide greater resolution in connection with overexposed pixels (e.g., bins at the higher end of the histogram) and underexposed pixels (e.g., bins at the lower end of the histogram) since pixel values towards the middle of the histogram may correspond to pixels that are (or are closer to being) properly exposed. In the example implementation of an eight bin histogram with pixel values represented by 12-bits, the distribution of pixel values for each zone may be represented as:

$$h(z, b) = \sum_{x(z)}\sum_{y(z)} C\{p(x, y), l(b), l(b+1)\}$$

where b is the bin index, b∈{0, 7} h(z, b) is the histogram value for bin b, zone z; C {p, min, max}=1, if (min≤p≤max) and 0 otherwise; x(z) and y(z) are the horizontal and vertical pixel ranges pertinent to zone z; and/(b) are the bin boundaries (e.g., I=[0,128,256, 512, 1024, 2048, 3584, 4032, 4096]).

Subsequent to generating histograms representing the distribution of pixel values for each zone, the pixel values in each of the histograms may be aggregated, as in step 512. The aggregation of the histogram values can provide an aggregated exposure value (e.g., an image statistic and/or parameters 162-1 and 162-2) associated with the image. In the example implementation of an eight-bin histogram with pixel values represented by 12-bits, the aggregated exposure value may be represented as:

$$\sum_{z=1}^{1024}\sum_{b=1}^{8} c(b)h(z, b)v(b)w(z)$$

where h(z, b) is the histogram value for bin b, zone z; v(b) are programmable histogram weights which are internally normalized to 1, such that $$\sum_{b=1}^{8} v(b) = 1;$$

w(z) are the normalized zone spatial weights, such that $$\sum_{z=1}^{1024} w(z) = 1;$$

and c(b) are pixel values specific to the bins, where c={0, 192,384, 768, 1536, 2816, 3808, 4095}. The histogram weights allow weighting different parts of the histogram to prioritize different objectives. For example, a weighting to minimize saturation of pixels may provide higher weights to bins toward the higher (e.g., saturated) end of the histogram, and may be represented as:

$$v(b) = \frac{1}{489} \{1, 2, 4, 8, 32, 64, 128, 250\}$$

Alternatively and/or in addition, a weighting to balance overexposure and underexposure may provide lower weights to bins in the middle of the histogram, and may be represented as:

$$v(b) = \frac{1}{135} \{8, 4, 2, 1, 8, 16, 32, 64\}$$

In step 514, the aggregated exposure value may be plotted on the response function, and an error relative to a target exposure value may be determined, and an exposure value can be determined based on the response function, the target exposure value, the aggregated exposure value, and the error, as in step 516. For example, the aggregated exposure value can be adjusted with a factor that is proportional to the error in determining the exposure value for the next frame to be captured in the stream of images. Determination of the exposure value using the response function, the target exposure value, and the aggregated exposure value can effectively be viewed as a search using the response function, the target exposure value, and the aggregated exposure value.

According to exemplary embodiments of the present disclosure, the exposure value for the image sensor may be determined, as in step 516. In exemplary implementations, exposure value for the image sensor may be determined using more than one image (e.g., the previous two frames/images, the previous three frames/images). Additionally, embodiments of the present disclosure may employ oversampling such that exposure values can be determined based on any combination of exploratory images/frames (e.g., images not sent for further processing) and captured images that are sent for further processing. Oversampling is described in further detail in connection with FIG. 6.

In step 518, a priority may be determined in connection with the determined exposure value. For example, based on the illumination conditions and the scene conditions associated with capturing of the images, an exposure time vs. gain priority can be determined. In an exemplary implementation where the imaging device is implemented on a UAV, parameters (e.g., transition points) associated with exposure time vs. gain priority may be determined based on operational parameters (e.g., speed, turning rate, climbing rate, descending rate, banking rate/angle, vibration, etc. of the UAV based on information received from sensor information received from sensors, such as GPS sensors, an IMU, gyroscopes, speed sensors, altimeters, etc.). Accordingly, the priority can then be applied to the exposure value to determine the exposure settings (e.g., exposure time and analog gain) that are to be applied to the imaging device in capturing subsequent images in the stream of images, as in step 520. According to embodiments of the present disclosure, the generalized exposure may be represented as $10^{ag/20}$ where $T_{exp}$ is the exposure time and ag is the analog gain, which may be a unitless logarithmic scalar applied by one or more amplifiers in the image sensor. Priority is discussed in further detail above in connection with FIGS. 4A and 4B.

After the exposure settings have been determined in step 520, a radiometric correction bias may be applied in step 522. For example, in multi-sensor devices, each sensor may have variations in optical parameters (e.g., the F-number of the attached lenses, performance of the sensor, etc.). Accordingly, to facilitate improved matching of corresponding image scanlines in such multi-sensor devices, a bias may be applied to compensate for any variations in the optical parameters. This may be a constant multiplier that may be applied to the exposure time to facilitate tuning of the image sensors in view of the variations of the optical parameters.

In step 524, it can then be determined if the image obtained in step 504 was an exploratory image (e.g., not sent to the processing system for further processing). In this regard, embodiments of the present disclosure may also employ oversampling in connection with determining exposure values. For example, image sensors may be able to capture frames at a rate faster than the associated processing system may be able to process. Based on the capabilities of the processing system, rather than sending every captured image to the processing system, some captured images may not be sent to the processing system, and only every second, third, fourth, fifth, etc. image may be sent to the processing system for processing. The frames not sent to the processing system may be processed in accordance with embodiments of the present disclosure to determine associated aggregated exposure values as exploratory exposure frames or images to improve convergence times to the exposure value. Accordingly, if the image captured in step 504 was an exploratory image, the process returns to step 504 to obtain a further image (e.g., the next frame in a stream of images). Alternatively, if the image captured in step 504 was not an exploratory image, the image is transmitted for further processing, as in step 526. The process then returns to step 504 to obtain a further image (e.g., the next frame in a stream of images).

Figure 6:
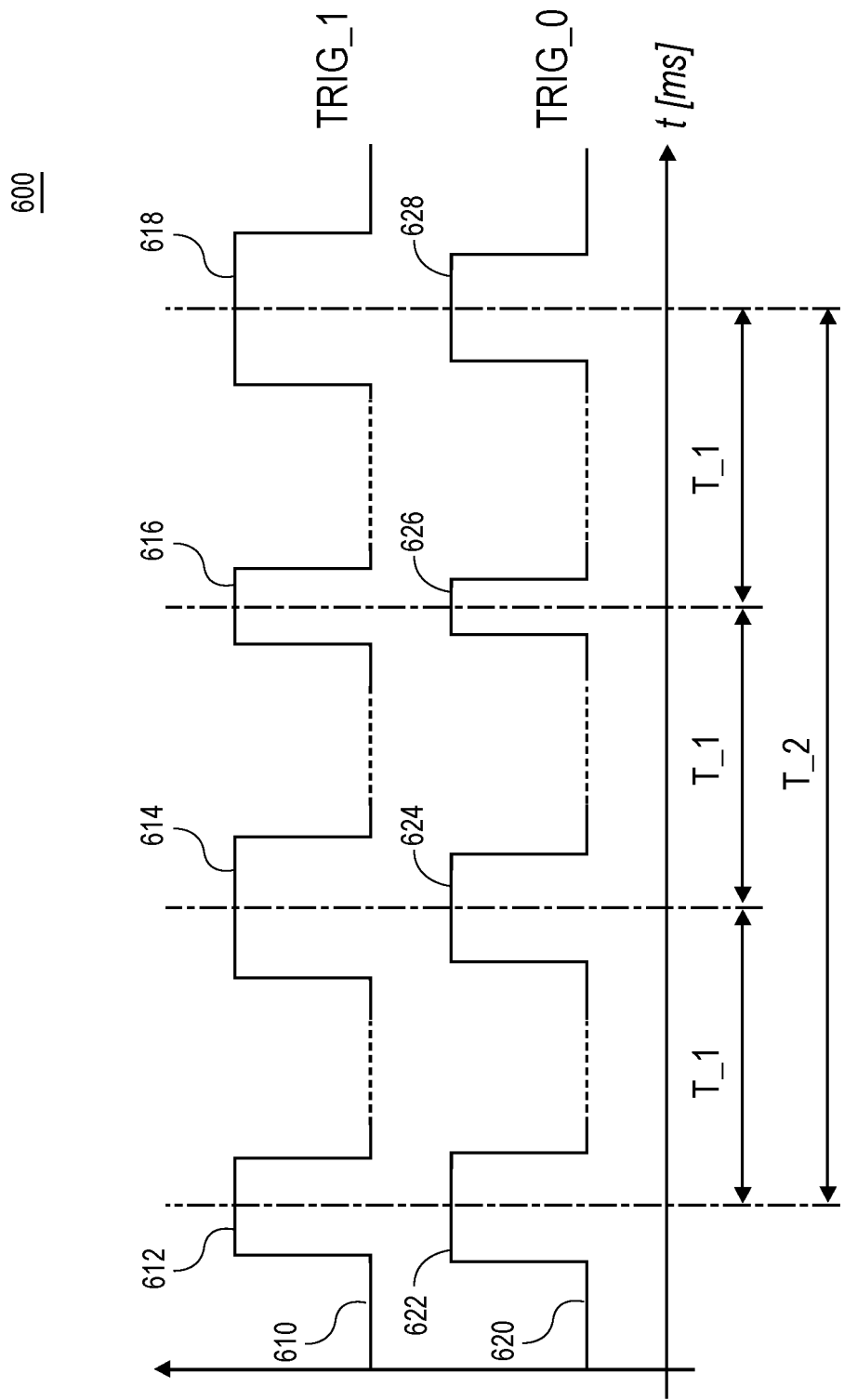
FIG. 6 is an illustration of an exemplary timing diagram, according to exemplary embodiments of the present disclosure.

FIG. 6 shows an exemplary timing diagram 600 of exposure pulses 610 and 620, according to exemplary embodiments of the present disclosure. The exposure pulses illustrated in FIG. 6 may be generated by a control processor (e.g., image sensor controller 156) and be utilized to control the exposure time of image sensors (e.g., image sensors 152-1 and 152-2). For example, the image sensors associated with center-synchronized periodic triggering pulse signals 610 and 620 may be image sensors (e.g., image sensors 152-1 and 152-2) of imaging devices (e.g., imaging devices 122-1 and 122-2) that are configured as a stereo pair.

FIG. 6 illustrates an exemplary implementation where the image sensor captures images at every T_1 seconds while the processing system processes frames at a rate at every T_2 seconds. As shown in FIG. 6, frames associated with pulses 612, 622, 618, and 628 may be sent to and processed by the processing system, while frames associated with pulses 614, 616, 624, and 626 may only be processed to determine aggregated exposure values as exploratory fames to improve convergence time to determining exposure time for the image sensors while not being sent to the processing system for further processing. Although FIG. 6 illustrates an exemplary implementation where every third frame is sent to the processing system for further processing, resulting in an oversampling rate of 3×, any oversampling rate may be employed (e.g., sending every other frame for further processing for an oversampling rate of 2×, sending every fourth frame for further processing for an oversampling rate of 4×, sending every fifth frame for further processing for an oversampling rate of 5×, etc.). Accordingly, oversampling can improve convergence times in determining exposure values for the image sensors.

Figure 7:
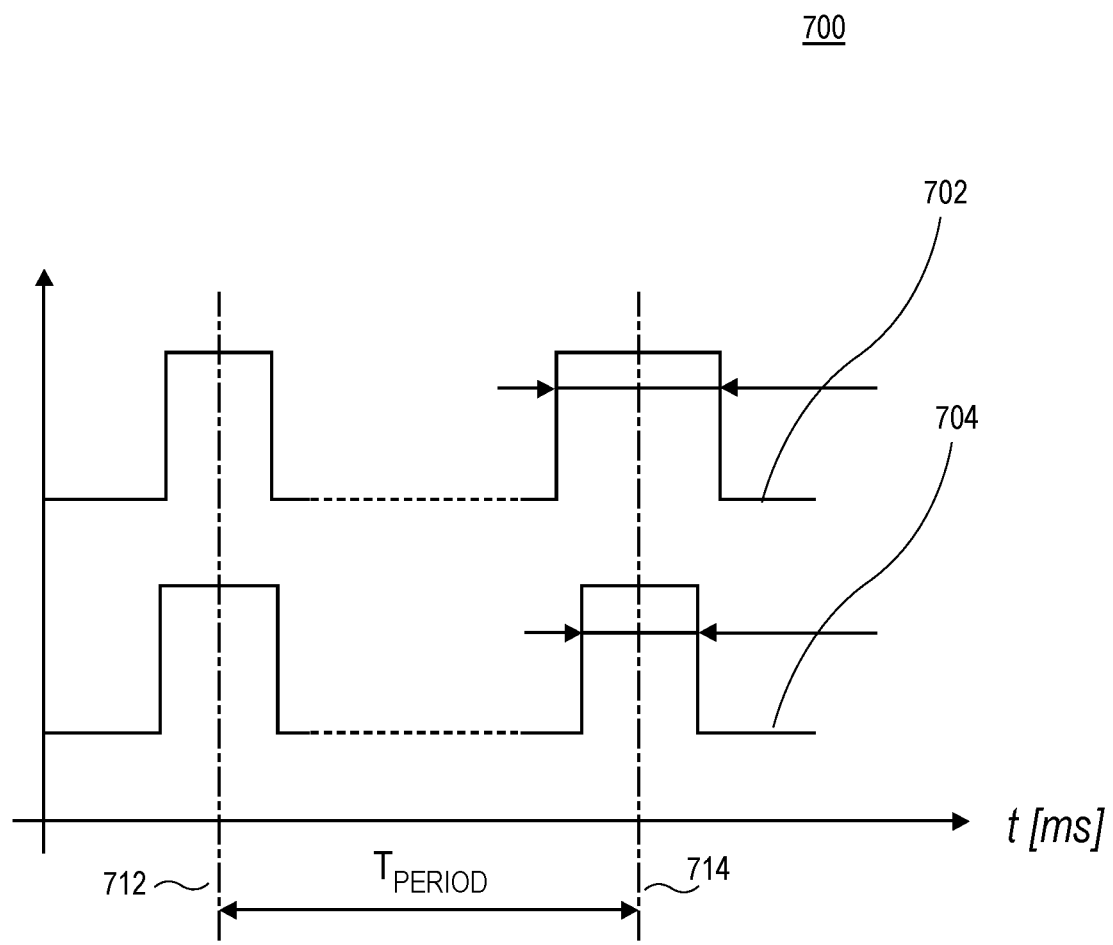
FIG. 7 is an illustration of an exemplary timing diagram of center-synchronized exposure triggering pulses, according to exemplary embodiments of the present disclosure.

FIG. 7 shows an exemplary timing diagram 700 of center-synchronized exposure triggering pulses, according to exemplary embodiments of the present disclosure. The center-synchronized triggering pulses illustrated in FIG. 7 may be generated by a control processor (e.g., image sensor controller 156) and be utilized to control the exposure time of image sensors (e.g., image sensors 152-1 and 152-2).

Embodiments of the present disclosure may provide a periodic train of exposure pulses having their centers of exposures aligned. FIG. 7 illustrates center-synchronized periodic triggering pulse signals 702 and 704. Center-synchronized periodic triggering pulse signals 702 and 704 may be associated with and provided to two separate image sensors (e.g., image sensors 152-1 and 152-2) to control the exposure time as each of the image sensors capture an image. For example, the image sensors associated with center-synchronized periodic triggering pulse signals 702 and 704 may be image sensors (e.g., image sensors 152-1 and 152-2) of imaging devices (e.g., imaging devices 122-1 and 122-2) that are configured as a stereo pair.

As shown in FIG. 7, rather than rising edge synchronizing of the pulses, embodiments of the present disclosure can provide center-synchronized pulses. Center aligning of the exposure time triggering pulses can facilitate more precise capturing of an identical scene, thereby mitigating, for example, motion artefacts. Accordingly, after exposure time for the image sensors have been determined, a start time for each pulse may be determined based on the exposure time and the period of the triggering pulse signals (e.g., half the exposure time before the center-aligned time of each pulse). As shown in FIG. 7, triggering pulses having different pulse widths may have different start times while being centered around the periodic centers 712 and 714 of each pulse duration of center-synchronized periodic triggering pulse signals 702 and 704.

Figure 8:
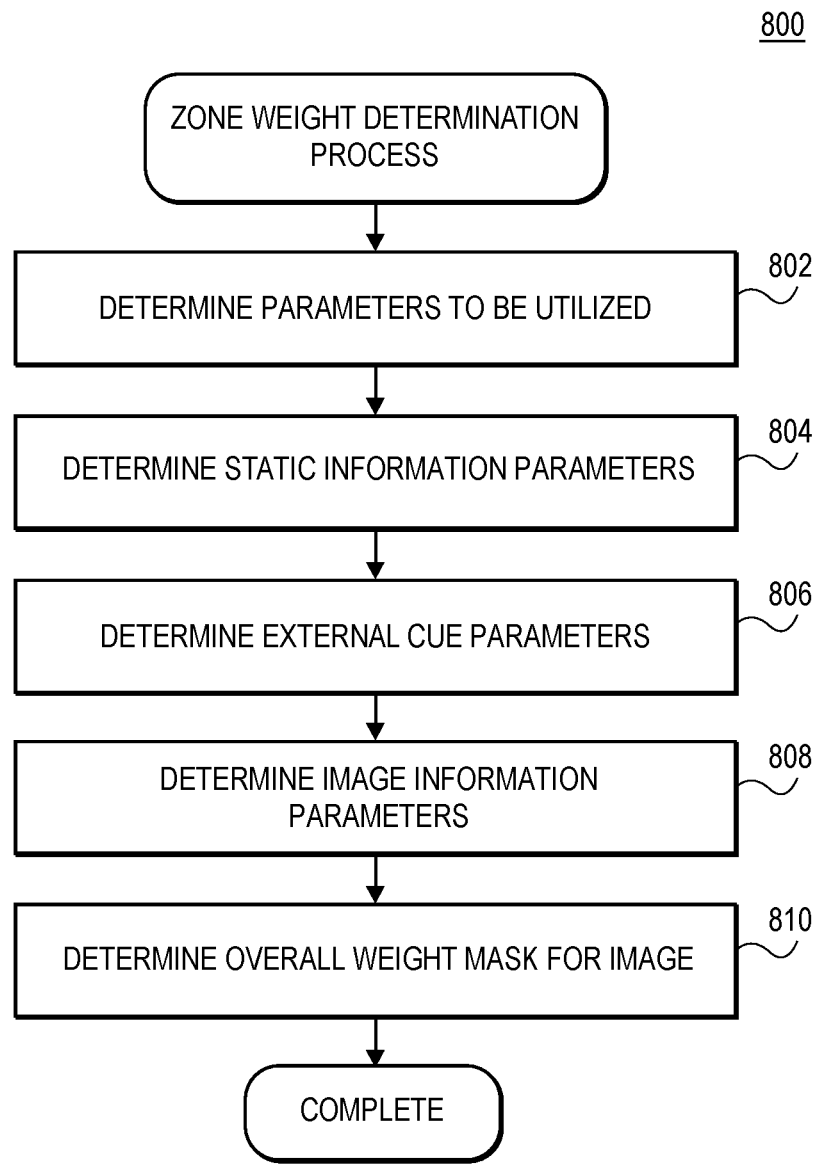
FIG. 8 is a flow diagram of an exemplary zone weight determination process, according to exemplary embodiments of the present disclosure.

FIG. 8 is a flow diagram of an exemplary zone weight determination process 800, according to exemplary embodiments of the present disclosure. According to exemplary embodiments, process 800 may be performed by a control processor (e.g., image sensor controller 156) in determining and assigning weights to each of the zones for a partitioned image.

As shown in FIG. 8, process 800 may begin with a determination of which parameters may be utilized in determination and assignment of weights to each of the zones, as in step 802. For example, the weights for each of the zones may be determined based on various parameters associated with the image, information included in the image, the imaging sensors that captured the image, the purpose of the machine vision system employing the imaging sensors, and the like. According to exemplary embodiments of the present disclosure, weighting of the zones may be based on any combination of static information associated with the imaging devices and/or the environment in which the imaging devices are operating, dynamic external information, and/or image information ascertained from the captured image.

In step 804, static information parameters may be determined. The static information may include information such as the known orientation and purpose of the imaging devices for which the exposure settings are being determined. For example, may be considered in determining and assigning weights to each zone. In the example implementation illustrated in FIG. 1A of UAV 120 and imaging devices 122-1 and 122-2, assuming that the primary purposes of imaging devices 122-1 and 122-2 are for navigation, guidance, and collision avoidance, zones closer to and including the scene around the horizon may have greater relative importance, and therefore greater weights, compared to zones that primarily include the sun, the sky, the ground, etc. Alternatively and/or in addition, downward facing cameras may place greater importance (and a greater weight) on zones toward the center of the image, based on the assumption that zones toward the periphery may have a greater likelihood of imaging the sun, reflections, and the like. Other implementations may assign greater weights to zones imaging ground features while zones imaging the sky may be assigned minimal weights. Accordingly, the weights may be assigned to the zones based on the function, purpose, and orientation of the imaging devices.

In addition to static information parameters, dynamic external cue parameters may also be determined, as in step 806. In the example implementation illustrated in FIG. 1A of UAV 120 and imaging devices 122-1 and 122-2, information may be obtained from other sensors of UAV 120, such as global positioning system (GPS) sensors, inertial measurement units (IMU), gyroscopes, speed sensors, altimeters, magnetometers, and the like. Information from these sensors may facilitate determinations regarding the location and positioning of the imaging sensors. Sensor information such as the angle of the horizon, position of the horizon (e.g., vertical, horizontal, etc.), and the like may be received from the various sensors of UAV 120. Based on the sensor information, the position of certain features, such as the sun, the horizon, etc. may be determined, and based on the purpose of the imaging sensors, weights can be determined and assigned to each of the zones based on relative importance of each zone. For example, the zones including an image of the sun may be considered to be of lesser importance with respect to determining exposure values and may be assigned a lower weight. Further, as UAV 120 navigates and maneuvers during its operation in the environment, information from the various sensors can continuously and dynamically facilitate determination of the relative position of features such as the sun, horizon, and the like, on a frame-by-frame basis.

In step 808, image information may also be determined for the determination and assigning of weights for each zone in the image. The images can be processed using known image processing algorithms (e.g., image segmentation, edge detection, object detection, etc.) to detect certain features in the images, which can be used to determine and assign weights to each zone in the image. For example, features such as the sky, horizon, sun, structures, and the like can be detected within the images, and weights for each of the zones can be determined and assigned based on the positioning of the detected features within the image. Zones in the image where the sun and sky have been detected may be assigned a lower weight, whereas zones where objects (e.g., for collision avoidance, navigation, guidance, etc.) have been detected may be assigned a higher weight. Alternatively and/or in addition, information content in each of the zones may also be used in determining the weights for each of the zones. For example, the image may be transformed into the frequency domain and each of the zones may be analyzed for high frequency content, vertical edge content, horizontal edge content, and the like. Based on the analysis, weights may be determined and analyzed for each of the zones, such that zones having higher frequency content and/or greater edge content may be assigned higher weights.

According to embodiments of the present disclosure, the spatial weighting of the zones may be based on any combination of the above-described considerations in determining and assigning weights to each of the zones, as in step 810. For example, one or more of the above-described considerations can facilitate determination of a normalized weight matrix to prioritize certain portions (e.g., the horizon, ground features, etc.) of the image over portions (e.g., the sun, reflections, etc.). Alternatively and/or in addition, one or more of the above-described considerations may be used to determine a mask layer specifying normalized multipliers that may be applied to a weight matrix. According to certain aspects, a static normalized weight matrix may be determined based on the static information associated with the imaging sensors, and one or more masks layers specifying normalized multipliers may be determined in view of dynamic external information and/or the image information. Accordingly, a final weighting may be determined based on a combination of the static normalized weight matrix and the one or more mask layers.

Figure 9:
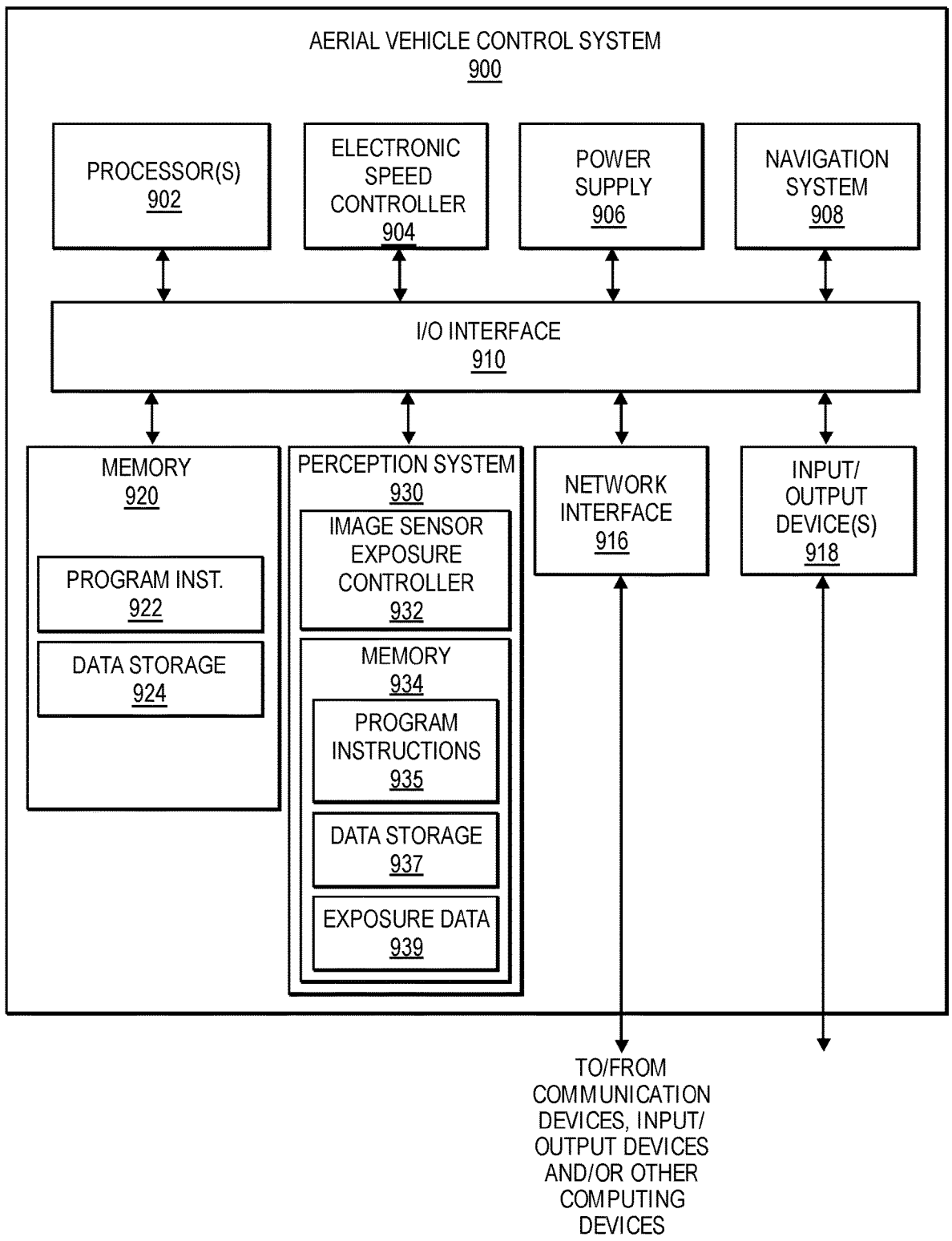
FIG. 9 is a block diagram illustrating various components of an exemplary aerial vehicle control system, according to exemplary embodiments of the present disclosure.

FIG. 9 is a block diagram illustrating various components of an exemplary aerial vehicle control system 900, according to exemplary embodiments of the present disclosure.

In various examples, the block diagram may be illustrative of one or more aspects of the aerial vehicle control system 900 that may be used to implement the various systems and processes discussed above. In the illustrated implementation, the aerial vehicle control system 900 includes one or more processors 902, coupled to a non-transitory computer readable storage medium 920 via an input/output (I/O) interface 910. The aerial vehicle control system 900 may also include an electronic speed controller 904, a power supply or battery 906, and/or a navigation system 908. The aerial vehicle control system 900 may further include a perception system 930, a network interface 916, and one or more input/output devices 918.

In various implementations, the aerial vehicle control system 900 may be a uniprocessor system including one processor 902, or a multiprocessor system including several processors 902 (e.g., two, four, eight, or another suitable number). The processor(s) 902 may be any suitable processor capable of executing instructions. For example, in various implementations, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 902 may commonly, but not necessarily, implement the same ISA.

The non-transitory computer readable storage medium 920 may be configured to store executable instructions, data, and sensor calibration data and/or characteristics, including environment properties data, sensor environment properties data, light properties data, particle properties data, nominal spectral characteristics of imaging sensors, current spectral characteristics of imaging sensors, differences between nominal and current spectral characteristics of imaging sensors, calibrations of spectral characteristics of imaging sensors, correlations or mappings between various of the data, and/or other data items accessible by the processor(s) 902. In various implementations, the non-transitory computer readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 920 as program instructions 922 and data storage 924, respectively.

In exemplary implementation, perception system 930 may include image sensor exposure controller 932, memory 934, program instructions 935, data storage 937, and exposure data 939, which may be configured to implement the exposure determination and correction functions, as described above. Program instructions, and/or exposure data 939 may be received, sent or stored upon different types of computer-accessible media, such as non-transitory media, or on similar media separate from the non-transitory computer readable storage medium 920, memory 934, or the aerial vehicle control system 900.

Generally, a non-transitory, computer readable storage medium may include storage media or memory media such as magnetic or optical media, e.g., disk or CD/DVD-ROM, coupled to the aerial vehicle control system 900 via the I/O interface 910. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 916.

In one implementation, the I/O interface 910 may be configured to coordinate I/O traffic between the processor(s) 902, the non-transitory computer readable storage medium 920, and any peripheral devices, the network interface or other peripheral interfaces, such as input/output devices 918. In some implementations, the I/O interface 910 may perform any necessary protocol, timing or other data transformations to convert data signals from one component (e.g., non-transitory computer readable storage medium 920) into a format suitable for use by another component (e.g., processor(s) 902). In some implementations, the I/O interface 910 may include support for devices attached through various types of peripheral buses, such as a variant of the Peripheral Component Interconnect (PCI) bus standard or the Universal Serial Bus (USB) standard, for example. In some implementations, the function of the I/O interface 910 may be split into two or more separate components, such as a north bridge and a south bridge, for example. Also, in some implementations, some or all of the functionality of the I/O interface 910, such as an interface to the non-transitory computer readable storage medium 920, may be incorporated directly into the processor(s) 902.

The electronic speed controller 904 communicates with the navigation system 908 and adjusts the operational characteristics of each propulsion mechanism to guide the aerial vehicle along a determined path and/or to perform other navigational maneuvers. The navigation system 908 may include a GPS, IMU, altimeter, speed sensors, or other similar system than can be used to navigate the aerial vehicle to and/or from a location.

The aerial vehicle control system 900 may also include perception system 930 that communicates with the processor(s) 902, the navigation system 908, the non-transitory computer readable storage medium 920, one or more imaging sensors, and/or other components or systems described herein to detect, measure, and/or process various properties associated with captured images, or perform other actions, functions, operations, or processes described herein, based at least in part on characteristics of the imaging sensors.

The network interface 916 may be configured to allow data to be exchanged between the aerial vehicle control system 900, other devices attached to a network, such as other computer systems, imaging sensors, and/or control systems of other vehicles, systems, machines, equipment, apparatuses, systems, or devices. For example, the network interface 916 may enable wireless communication between numerous aerial vehicles. In various implementations, the network interface 916 may support communication via wireless general data networks, such as a Wi-Fi network. For example, the network interface 916 may support communication via telecommunications networks such as cellular communication networks, satellite networks, and the like.

Input/output devices 918 may, in some implementations, include one or more displays, imaging sensors, image capture devices, thermal sensors, infrared sensors, time of flight sensors, accelerometers, pressure sensors, weather sensors, various other sensors described herein, etc. Multiple input/output devices 918 may be present and controlled by the aerial vehicle control system 900. One or more of these sensors may be utilized to assist in performing the various functions, operations, and processes described herein.

As shown in FIG. 9, the memory may include program instructions 922, which may be configured to implement the example processes and/or sub-processes described above. The data storage 924 may include various data stores for maintaining data items that may be provided for performing the various functions, operations, and processes described herein. For example, the exposure data 939 and/or the data storage 924 may include environment properties data, sensor environment properties data, light properties data, particle properties data, nominal spectral characteristics of imaging sensors, current spectral characteristics of imaging sensors, differences between nominal and current spectral characteristics of imaging sensors, calibrations of spectral characteristics of imaging sensors, correlations or mappings between various of the data, and/or other data items.

Although some of the embodiments disclosed herein reference the operation of unmanned aerial vehicles having stereo pairs of digital cameras, those of ordinary skill in the pertinent arts will recognize that the systems and methods disclosed herein are not so limited, and may be utilized with any type of or other machine vision system capturing a stream of images.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow chart of FIGS. 5 and 8, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
 a first imaging device configured to capture a first plurality of images that form a first stream of images and a second imaging device configured to capture a second plurality of images that form a second stream of images, wherein the first imaging device and the second imaging device are configured as a stereo pair;

an exposure controller configured to, at least:
obtain a first image from the first plurality of images;
obtain a second image from the second plurality of images;
partition the first image into a first plurality of zones;
partition the second image into a second plurality of zones;
generate, for each of the first plurality of zones, a first non-uniformly distributed histogram including a first distribution of pixel values corresponding to a first plurality of pixels disposed within each of the first plurality of zones;
generate, for each of the second plurality of zones, a second non-uniformly distributed histogram including a second distribution of pixel values corresponding to a second plurality of pixels disposed within each of the second plurality of zones;
aggregate the first non-uniformly distributed histograms generated for each of the first plurality of zones to generate a first aggregated exposure value associated with the first image;
aggregate the second non-uniformly distributed histograms generated for each of the second plurality of zones to generate a second aggregated exposure value associated with the second image;
determine, based at least in part on a first response function associated with the first imaging device, a first error between the first aggregated exposure value and a first target exposure;
determine, based at least in part on a second response function associated with the second imaging device, a second error between the second aggregated exposure value and a second target exposure;
determine, based at least in part on the first response function and the first error, a first exposure value for the first imaging device in capturing a first subsequent image in the first stream of images; and
determine, based at least in part on the second response function and the second error, a second exposure value for the second imaging device in capturing a second subsequent image in the second stream of images.

2. The unmanned aerial vehicle of claim 1, wherein the exposure controller is further configured to, at least:
obtain a third image from the first plurality of images;
partition the third image into a third plurality of zones;
generate, for each of the third plurality of zones, a third non-uniformly distributed histogram including a third distribution of pixel values corresponding to a third plurality of pixels disposed within each of the third plurality of zones;
aggregate the third non-uniformly distributed histograms generated for each of the third plurality of zones to generate a third aggregated exposure value associated with the third image;
determine, based at least in part on the first response function associated with the first imaging device, a third error between the third aggregated exposure value and the first target exposure; and
determine the first exposure value for the first imaging device in capturing the first subsequent image in the stream of images, wherein determining first exposure value is based at least in part on the first response function, the first error, and the third error.

3. The unmanned aerial vehicle of claim 1, wherein the exposure controller is further configured to, at least:
determine a spatial weight mask to be applied to the first plurality of zones,
wherein the spatial weight mask is determined based on at least one of:
static information associated with the first imaging device;
dynamic external information associated with the first imaging device; or
image information extracted from the first image.

4. The unmanned aerial vehicle of claim 3, further comprising:
an inertial measurement unit (IMU); and
a global positioning system (GPS) sensor,
wherein the dynamic external information includes at least one of an angle of a horizon or a position of the horizon, the angle of the horizon and the position of the horizon being determined based at least in part on sensor information obtained from the IMU and the GPS sensor.

5. The unmanned aerial vehicle of claim 1, further comprising:
a plurality of sensors, and
wherein the first exposure value is a generalized exposure, and the exposure controller is further configured to, at least:
determine, based at least in part on information obtained from the plurality of sensors, a priority associated with the first exposure value; and
determine, based at least in part on the priority and the first exposure value, exposure settings for the first imaging device, the exposure settings including an exposure time and an analog gain.

6. The unmanned aerial vehicle of claim 1, wherein the exposure controller is further configured to, at least:
generate a first periodic exposure triggering signal configured to enable a first exposure of the first imaging device and
generate a second periodic exposure triggering signal configured to enable a second exposure of the second imaging device,
wherein the first periodic exposure triggering signal includes first pulses that are center synchronized with second pulses of the second periodic exposure triggering signal.

7. A machine vision system, comprising:
a first image sensor configured to capture a first stream of images;
an image sensor controller configured to, at least:
obtain a first image from the first stream of images;
generate, based at least in part on a first plurality of histograms associated with the first image, a first aggregated exposure value;
determine an exposure value, wherein determining the exposure value is based at least in part on a response function associated with the first image sensor and an error between the first aggregated exposure value and a target exposure;
determine, based at least in part on the exposure value, an associated exposure time and an analog gain; and
apply the exposure time and the analog gain to the first image sensor to capture a subsequent image in the first stream of images that is subsequent to the first image.

8. The machine vision system of claim 7, wherein the image sensor controller is further configured to, at least:
  obtain a second image from the first stream of images; and
  generate, based at least in part on a second plurality of histograms associated with the second image, a second aggregated exposure value,
  wherein the exposure value is further determined based at least in part on the response function associated with the first imaging device and a second error between the second aggregated exposure value and the target exposure.

9. The machine vision system of claim 8, wherein the second image is an exploratory image such that the image sensor controller employs oversampling in determining the exposure value.

10. The machine vision system of claim 7, wherein the image sensor controller is further configured to, at least:
  partition the first image into a plurality of zones,
  wherein each zone of the plurality of zones is associated with a respective one of the first plurality of histograms, and
  wherein each respective histogram includes a distribution of pixel values corresponding to pixels disposed within the associated zone of the plurality of zones.

11. The machine vision system of claim 10, wherein:
  each of the first plurality of histograms are non-uniformly distributed;
  each of the first plurality of histograms includes a plurality of non-uniformly distributed bins, each of the plurality of non-uniformly distributed bins corresponding to a respective range of pixel values; and
  a first bin from the plurality of non-uniformly distributed bins disposed at an edge of the histogram including a narrower range of pixel values than a second bin disposed in a middle of the histogram.

12. The machine vision system of claim 10, wherein the image sensor controller is further configured to, at least:
  determine a plurality of spatial weights to be applied to the plurality of zones based at least in part on at least one of:
    static information associated with the first imaging device;
    dynamic external information associated with the first imaging device; or
    image information extracted from the first image.

13. The machine vision system of claim 12, wherein the image information extracted from the first image includes at least one of:
  a frequency content associated with at least one of the plurality of zones;
  edge content associated with at least one of the plurality of zones; or
  objects detected in at least one of the plurality of zones.

14. The machine vision system of claim 7, wherein the image sensor controller is further configured to:
  determine a polynomial approximation of the response function associated with the first imaging device, and
  wherein determination of the exposure value is based at least in part on the polynomial approximation of the response function associated with the first imaging device.

15. The machine vision system of claim 7, wherein the image sensor controller is further configured to, at least:
  apply a respective histogram weight to each bin of the first plurality of histograms.

16. A method for automatically determining exposure settings for an image sensor, comprising:
  obtaining a first frame from a first stream of images captured by a first image sensor;
  obtaining a second frame from a second stream of images captured by a second image sensor, the first image sensor and the second image sensor being configured as a stereo pair;
  partitioning the first frame into a first plurality of zones;
  partitioning the second frame into a second plurality of zones;
  generating, for each of the first plurality of zones, a first histogram including a first distribution of pixel values corresponding to a first plurality of pixels disposed within each of the first plurality of zones;
  generating, for each of the second plurality of zones, a second histogram including a second distribution of pixel values corresponding to a second plurality of pixels disposed within each of the second plurality of zones;
  aggregating the first histograms generated for each of the first plurality of zones to generate a first aggregated exposure value associated with the first frame;
  aggregating the second histograms generated for each of the second plurality of zones to generate a second aggregated exposure value associated with the second frame;
  determining a first exposure value for the first image sensor, wherein determining the first exposure value for the first image sensor is based at least in part on a first response function associated with the first image sensor and a first error between the first aggregated exposure value and a first target exposure;
  determining a second exposure value for the second image sensor, wherein determining the second exposure value for the second image sensor is based at least in part on a second response function and a second error between the second aggregated exposure value and a second target exposure;
  capturing, using the first image sensor, a first subsequent image utilizing the first exposure value; and
  capturing, using the second image sensor, a second subsequent image utilizing the second exposure value.

17. The method of claim 16, further comprising:
  obtaining a third frame from the first stream of images;
  obtaining a fourth frame from the second stream of images;
  partitioning the third frame into a third plurality of zones;
  partitioning the fourth frame into a fourth plurality of zones;
  generating, for each of the third plurality of zones, a third histogram including a third distribution of pixel values corresponding to a third plurality of pixels disposed within each of the third plurality of zones;
  generating, for each of the fourth plurality of zones, a fourth histogram including a fourth distribution of pixel values corresponding to a fourth plurality of pixels disposed within each of the fourth plurality of zones;
  aggregating the third histograms generated for each of the third plurality of zones to generate a third aggregated exposure value associated with the third frame, wherein the first exposure value for the first image sensor is determined further based on the third aggregated exposure value; and
  aggregating the fourth histograms generated for each of the fourth plurality of zones to generate a fourth aggregated exposure value associated with the fourth frame, wherein the second exposure value for the second image sensor is determined further based on the fourth aggregated exposure value.

18. The method of claim 16, further comprising:
determining, based at least in part on the first exposure value, a first exposure time and a first analog gain; and
determining, based at least in part on the second exposure value, a second exposure time and a second analog gain.

19. The method of claim 18, further comprising:
applying a bias to at least one of the first exposure time and the second exposure time to tune the first image sensor and the second image sensor.

20. The method of claim 18, further comprising:
generating a first periodic exposure triggering signal configured to control the first exposure time and a second periodic exposure triggering signal configured to control the second exposure time, such that a first plurality of pulses of the first periodic exposure triggering signal are center-aligned with a second plurality of pulses of the second periodic exposure triggering signal.

21. The machine vision system of claim 7, wherein the image sensor controller is further configured to, at least:
partition the first image into a plurality of non-uniformly sized zones,
wherein sizes of the plurality of non-uniformly sized zones are based at least in part on a relative importance of each zone of the plurality of non-uniformly sized zones.

* * * * *